(12) United States Patent
Bookstaff

(10) Patent No.: US 9,183,579 B2
(45) Date of Patent: Nov. 10, 2015

(54) AUTOMATICALLY ADDING GRATUITY TO AMOUNT CHARGED IN ELECTRONIC TRANSACTION

(76) Inventor: Blake Bookstaff, Knoxville, TN (US)

( * ) Notice: Subject to any disclaimer, the term of this patent is extended or adjusted under 35 U.S.C. 154(b) by 438 days.

(21) Appl. No.: 12/392,192

(22) Filed: Feb. 25, 2009

(65) Prior Publication Data

US 2010/0217676 A1 Aug. 26, 2010

Related U.S. Application Data

(63) Continuation of application No. 12/391,402, filed on Feb. 24, 2009.

(51) Int. Cl.
*G06Q 20/00* (2012.01)
*G06Q 30/06* (2012.01)
*G06Q 20/04* (2012.01)
*G06Q 20/20* (2012.01)
*G06Q 40/00* (2012.01)

(52) U.S. Cl.
CPC .............. *G06Q 30/06* (2013.01); *G06Q 20/04* (2013.01); *G06Q 20/204* (2013.01); *G06Q 40/00* (2013.01)

(58) Field of Classification Search
CPC ....... G06Q 20/20; G06Q 50/12; G07F 7/1008
See application file for complete search history.

(56) References Cited

U.S. PATENT DOCUMENTS

| | | | |
|---|---|---|---|
| 5,708,422 A | 1/1998 | Blonder et al. | |
| 5,751,798 A | 5/1998 | Mumick et al. | |
| 6,019,393 A | 2/2000 | Loebner | |
| 7,039,611 B2 | 5/2006 | Devine | |
| 7,231,353 B1 | 6/2007 | Goyal | |
| 7,337,119 B1 | 2/2008 | Geschwender et al. | |
| 7,370,794 B2 * | 5/2008 | Trane | 235/380 |
| 7,454,370 B2 * | 11/2008 | Baril et al. | 705/14.4 |
| 2005/0043996 A1 * | 2/2005 | Silver | 705/15 |
| 2005/0071232 A1 * | 3/2005 | Frater | 705/16 |

(Continued)

FOREIGN PATENT DOCUMENTS

WO 2006000021 1/2006

OTHER PUBLICATIONS

Information Disclosure Statement (IDS) Letter Regarding Common Patent Application(s), submitted by Applicant of Jan. 6, 2010.
http://www.punny.org/money/fight-thieving-restaurant-servers-with-checksum-tips/.

(Continued)

*Primary Examiner* — Ryan Zeender
*Assistant Examiner* — Dana Amsdell
(74) *Attorney, Agent, or Firm* — Tillman Wright, PLLC; Chad D. Tillman; Jeremy C. Doerre

(57) ABSTRACT

A method includes receiving a payment object for payment of a certain amount owed by a first party to a second party. The payment object carries sufficient account information for the payment from an account associated with the payment object. The second party communicates the account information from the payment object and an identification of the second party for receipt by a third party; and receives in return data that is indicative of a gratuity to be charged against the account. The second party prints a document that includes the certain amount owed and the gratuity, as indicated by the data received by the second party, and presents the document for signature by the first party. The printed document preferably includes the total of the amount owed and the gratuity. The payment object may be a credit card, charge card, debit card, rebate card, or stored-value card.

20 Claims, 22 Drawing Sheets

(56) References Cited

U.S. PATENT DOCUMENTS

| | | | |
|---|---|---|---|
| 2005/0108116 A1 | 5/2005 | Dobson et al. | |
| 2005/0236476 A1 | 10/2005 | Murray et al. | |
| 2007/0215695 A1 | 9/2007 | Trane | |
| 2008/0065396 A1 | 3/2008 | Marshall | |
| 2008/0156865 A1* | 7/2008 | Leifer | 235/379 |
| 2008/0200144 A1* | 8/2008 | Ginsberg et al. | 455/407 |
| 2009/0037286 A1* | 2/2009 | Foster | 705/21 |
| 2009/0055269 A1* | 2/2009 | Baron | 705/14 |

OTHER PUBLICATIONS http://www/fatwallet.com/forums/finance/771939.

http://web.archive.org/web/20071008205727/www.alaric.com/public/products/fractals.

http://chowhound.chow.com/topics/440179, "Tip calculator at the bottom of the bill", Internet, Accessed Wednesday, Nov. 26, 2008.

Information Disclosure Statement (IDS) Letter Regarding Common Patent Application(s), dated Jun. 29, 2010.

* cited by examiner

```
         Ruby Foo's Times Square
         1626 Broadway @ 49th NYC
              (212)489-5600

472 Daniel
      ----------------------------------------
      Tbl 106/1        Chk 1025         Gst 3
                Nov23'08 06:32PM
      ----------------------------------------
        2 RubyFoo Cocktail          22.00
        1 PassionCosmo              11.00
        1 ChixWrap#14                9.50
        1 DimSumSam#20              14.00
        1 Spare Ribs #17            10.00
        1 Shmp Sprngrll#9           10.50
        1 Mai Tai                   11.00
        1 Ruby's Chicke#50          19.00
        1 SizzleBeef#55             23.00 food                      86.00
          liquor                    44.00
          Tax                       10.89
      08:13PM Total Due           140.89

----------------------------------------
      Quick Guide
      15%  19.50  Total    160.39
      18%  23.40  Total    164.29
      20%  26.00  Total    166.89
      ----------------------------------------
```

FIG. 1     prior art

```
                Ruby Foo's Times Square
              1626 Broadway @ 49th NYC
                    (212)489-5600
    Date:        Nov23'08 08:22PM
    Card Type:   Mastercard
    Acct #:      XXXXXXXXXXXX9019
    Trans Key:   FIF00005877056I
    Exp Date:    XX/XX
    Auth Code:   F7232B
    Check:       1025
    Table:       106/1
    Server:      472 Daniel Subtotal:            140.89

Tip_____

Total_____

Signature_____

------------------------------
    Quick Guide
    15%  19.50  Total   160.39
    18%  23.40  Total   164.29
    20%  26.00  Total   166.89
    ------------------------------
```

```
            Ruby Foo's Times Square
            1626 Broadway @ 49th NYC
                 (212)489-5600

472 Daniel
        ------------------------------------
        Tbl 106/1      Chk 1025        Gst 3
                  Nov23'08 06:32PM
        ------------------------------------
          2 RubyFoo Cocktail          22.00
          1 PassionCosmo              11.00
          1 ChixWrap#14                9.50
          1 DimSumSam#20              14.00
          1 Spare Ribs #17            10.00
          1 Shmp Sprngrll#9           10.50
          1 Mai Tai                   11.00
          1 Ruby's Chicke#50          19.00
          1 SizzleBeef#55             23.00 food                      86.00
            liquor                    44.00
            Tax                       10.89
        08:13PM Total Due           140.89

------------------------------------
        Quick Guide
        15%   19.50   Total     160.39
        18%   23.40   Total     164.29
        20%   26.00   Total     166.89
        ------------------------------------
```

```
         Ruby Foo's Times Square
         1626 Broadway @ 49th NYC
              (212)489-5600
  Date:       Nov23'08 08:22PM
  Card Type:  Mastercard
  Acct #:     XXXXXXXXXXXX9019
  Trans Key:  FIF000058770561
  Exp Date:   XX/XX
  Auth Code:  F7232B
  Check:      1025
  Table:      106/1
  Server:     472 Daniel Subtotal:              140.89

Tip:                 23.40

Total:              164.29

Signature:_____

----------------------------------
  Quick Guide
  15%  19.50  Total    160.39
  18%  23.40  Total    164.29
  20%  26.00  Total    166.89
  ----------------------------------
```

```
┌─────────────────────────────────────┐
│ Receiving from customer,            │
│ by a merchant, a card for payment   │
│ 202                                 │
└─────────────────────────────────────┘
                  │
                  ▼
┌─────────────────────────────────────┐
│ Electronically communicating, by the merchant for
│ receipt by a third party, both account information from
│ the card and an identification of the merchant
│ 204                                 │
└─────────────────────────────────────┘
                  │
                  ▼
┌─────────────────────────────────────┐
│ Electronically receiving, by the merchant,
│ a determined gratuity amount
│ 206                                 │
└─────────────────────────────────────┘
                  │
                  ▼
┌─────────────────────────────────────┐
│ Printing, by the merchant, a document including
│ both the amount owed and the determined gratuity
│ 208                                 │
└─────────────────────────────────────┘
                  │
                  ▼
┌─────────────────────────────────────┐
│ Presenting, by the merchant to the customer,
│ the printed document for signature by the customer
│ 210                                 │
└─────────────────────────────────────┘
                  │
                  ▼
┌─────────────────────────────────────┐
│ Receiving, from the customer by the merchant, the
│ printed documented signed by the customer
│ 212                                 │
└─────────────────────────────────────┘
```

```
┌─────────────────────────────────────┐
│      Receiving from customer,       │
│   by a merchant, a card for payment │
│                 222                 │
└─────────────────────────────────────┘
                  │
                  ▼
┌─────────────────────────────────────┐
│  Electronically communicating, by the merchant for │
│  receipt by a third party, both account information from │
│    the card and an identification of the merchant   │
│                 224                 │
└─────────────────────────────────────┘
                  │
                  ▼
┌─────────────────────────────────────┐
│   Electronically receiving, by the merchant, │
│       a determined gratuity amount  │
│                 226                 │
└─────────────────────────────────────┘
                  │
                  ▼
┌─────────────────────────────────────┐
│  Presenting on a display an image of a document, │
│  including both the amount owed and the determined │
│  gratuity, or portions thereof, for review by the customer │
│                 228                 │
└─────────────────────────────────────┘
                  │
                  ▼
┌─────────────────────────────────────┐
│  Electronically capturing a signature of the customer, │
│  such as by having the customer sign his or her name on │
│  a touchscreen display with an appropriate implement │
│                 230                 │
└─────────────────────────────────────┘
                  │
                  ▼
┌─────────────────────────────────────┐
│  Printing a receipt for the customer, including the amount │
│     owed, gratuity, and the customer's electronically │
│               captured signature    │
│                 232                 │
└─────────────────────────────────────┘
```

| | Merchant Category | Gratuity % | Major Code |
|---|---|---|---|
| + | Restaurant | 18.5% | 10.0 |
| + | Hair Salon | 11.0% | 20.0 |
| + | Taxi Services | 8.0% | 30.0 |
| + | Massage Services | 22.0% | 40.0 |
| + | Delivery Services | 10.0% | 50.0 |
| + | *Add...* | | |

| | Merchant Category | | Merchant | Gratuity % | Major Code | Minor Code |
|---|---|---|---|---|---|---|
| − | Restaurant | | | 18.5% | 10.0 | |
| | | + | Chili's | | 10.0 | 10.1 |
| | | + | Subway | 7.0% | 10.0 | 10.2 |
| | | + | Flemings | 22.0% | 10.0 | 10.3 |
| | | + | Add... | | | |
| + | Hair Salon | | | 11.0% | 20.0 | |
| + | Taxi Services | | | 8.0% | 30.0 | |
| + | Massage Services | | | 22.0% | 40.0 | |
| + | Delivery Services | | | 10.0% | 50.0 | |
| + | Add... | | | | | |

| | Merchant Category | | Merchant | Location | Gratuity % | Major Code | Minor Code | Specific Code |
|---|---|---|---|---|---|---|---|---|
| - | Restaurant | | | | 18.5% | 10.0 | | |
| | | - | Chili's | | | 10.0 | 10.1 | |
| | | | | 4409 N Lamar St Austin Tx | 20.0% | | | 10.1.1 |
| | | | | 1019 E Markt St. Houston, Tx | 18.5% | | | 10.1.6 |
| | | | | 123 Main St. W. Austin Tx | 20.0% | | | 10.1.1 |
| | | | | Add... | | | | |
| | | + | Subway | | 7.0% | 10.0 | 10.2 | |
| | | + | Flemings | | 22.0% | 10.0 | 10.3 | |
| | | + | Add... | | | | | |
| + | Hair Salon | | | | 11.0% | 20.0 | | |
| + | Taxi Services | | | | 8.0% | 30.0 | | |
| + | Massage Services | | | | 22.0% | 40.0 | | |
| + | Delivery Services | | | | 10.0% | 50.0 | | |
| + | Add... | | | | | | | |

| Date | Merchant Category | Merchant | Location | Gratuity % | ID # | Merchant Total | Transaction Total |
|---|---|---|---|---|---|---|---|
| | Restaurant | | | 18.5% | | | |
| - | Restaurant #1 | Chili's | ALL | *** | 100.0 | | |
| 8/1/2008 | | Chili's | 4409 W 45th St | 20.0% | 100.1 | $ 64.25 | $ 77.10 |
| 8/7/2008 | | Chili's | 8622 US HWY 183 | 18.5% | 100.2 | $ 15.66 | $ 18.56 |
| 8/15/2008 | | Chili's | 4409 W 45th St | 20.0% | 100.1 | $ 68.88 | $ 82.66 |
| 8/17/2008 | | Chili's | 4409 W 45th St | 20.0% | 100.1 | $ 104.25 | $ 125.10 |
| 8/22/2008 | | Chili's | 2249 IH-35, Dallas Tx | 18.5% | 100.3 | $ 15.66 | $ 18.56 |
| 8/24/2008 | | Chili's | 7455 Walter Dr. | 18.5% | 100.4 | $ 16.25 | $ 19.26 |
| 8/28/2008 | | Chili's | 3321 Tollway 8, Houston Tx | 18.5% | 100.5 | $ 18.55 | $ 21.98 |
| 8/31/2008 | | Chili's | 7455 Walter Dr. | 18.5% | 100.4 | $ 32.12 | $ 38.06 |
| | | | | | | | |

FIG. 18

```
        Ruby Foo's Times Square
       1626 Broadway @ 49th NYC
              (212)489-5600
   Date:        Nov23'08 08:22PM
   Card Type:   Mastercard
   Acct #:      XXXXXXXXXXXX9019
   Trans Key:   FIF00005877056I
   Exp Date:    XX/XX
   Auth Code:   F7232B
   Check:       1025
   Table:       106/1
   Server:      472 Daniel Subtotal:           140.89

Tip_____

Total_____

Signature_____

------------------------------
   Your Gratuities Guide 12.5%     16.25     Total  157.14
   15.0%     19.50     Total  160.39
   17.5%     22.75     Total  163.65
   20.0%     26.00     Total  166.89
   ------------------------------
```

*FIG. 20*

AUTOMATICALLY ADDING GRATUITY TO AMOUNT CHARGED IN ELECTRONIC TRANSACTION

CROSS-REFERENCE TO RELATED APPLICATION

The present application is a U.S. continuation patent application of and claims priority under 35 U.S.C. §120 to, U.S. nonprovisional patent application Ser. No. 12/391,402, filed Feb. 24, 2009, which patent application and any patent application publications thereof are incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to methods, systems and apparatus for facilitating gratuities when payments for services are charged to accounts in electronic transactions.

When a customer makes payment to a service provider for a service for which a gratuity customarily is given, often a lull occurs when paying with a card. Exemplary such service providers include, but are not limited to, restaurants, massage parlors, taxi companies, bars, spas, nail salons, and hair salons. The service provider (sometimes called a merchant in this context) must authorize the original amount for the service and present to the customer a printed document bearing the amount to be charged for the service for the customer's approval by way of the customer's signature. At this stage, the customer makes a gratuity calculation and adds the gratuity to the document and totals the amount to be charged to the customer's card. It is believed that upon receiving the signed document with the total amount to be charged, the merchant reauthorizes the new amount and the new amount thereafter is charged to the customer's card. As will be appreciated, this process can be characterized as inefficient for requiring an undue amount of time, and can cause dissatisfaction and stress to the customer if the customer is in a hurry. Moreover, having to calculate a gratuity and then add the gratuity to the amount being charged for the services can cause delay and result in stress and dissatisfaction with the payment process. In the context of a restaurant, it is indeed inconvenient for a customer to have to perform mathematical calculations after a relaxing meal, especially after having consumed alcohol. Calculating the gratuity and then adding the gratuity to the amount charged for the services also can lead to errors, resulting in overpayment or underpayment of the gratuity that is intended to be left.

Indeed, it is believed that there exists a high incidence of assigning too little or too large an amount to the total transaction because of human error and/or errors associated with rounding. Tipping too little hurts a merchant, because expected gratuities are often times factored into the wages paid to employees of the merchant, and so inadvertent errors by customers may directly and adversely affect the income of the merchant's employees. On the other hand, unintentionally over tipping harms the customer.

One solution that has been utilized includes printing on the document that the customer signs a plurality of amounts equal to certain gratuity percentages. An example of this solution is illustrated in FIGS. 1-2, wherein a sales receipt for restaurant services is illustrated in FIG. 1 and a corresponding sales slip for payment thereof by a credit card is illustrated in FIG. 2. As shown on both of these printed documents, a "Quick Guide" table sets forth three instances of gratuity percentages; the corresponding amount of each gratuity percentage based on the food and liquor sales (i.e., tax is excluded); and the corresponding total to be charged to the credit card for each of the gratuity percentages. The three gratuity percentages presented in the "Quick Guide" table are 15%, 18%, and 20%; the corresponding gratuity amounts are, respectively, $19.50, $23.40, and $26.00; and the respective resulting totals are $160.39, $164.29, and $166.89.

While this solution provides some benefit, it is believed that the Quick Guide table calculations are made by the Point of Sale (POS) terminal when the document is printed, and that the POS terminal is preconfigured to print the amounts corresponding to the gratuity percentages predetermined by the merchant (in the example, the predetermined percentages corresponding to 15%, 18%, and 20%) each time a sales receipt and credit card transaction slip are generated. Consequently, it is not believed that the percentages can be customized or established by each customer nor tied to the particular cards of the customers that may be used to pay for the services. Moreover, it is believed that such Quick Guide table calculations are in limited use and, therefore, of limited benefit in overall electronic transactions.

In view of the foregoing, it is believed that an improvement is needed in how gratuities are calculated and added to the amounts charged in electronic transactions. Such need is believed to be addressed by one or more aspects of the present invention.

SUMMARY OF THE INVENTION

The present invention includes many aspects and features. Moreover, while many aspects and features relate to, and may be described in, the context of credit cards (including secured credit cards), the present invention is not limited to use only in such contexts, as will become apparent from the following summaries and detailed descriptions of aspects, features, and one or more embodiments of the present invention. Indeed, the present invention has equal applicability, for instance, in the context of debit cards, stored-value cards, retail cards, and rebate cards, and the like with which a payment to a merchant may be made.

Accordingly, in a first aspect of the invention, a method includes the steps of: receiving, from a first party by a second party, a payment object bearing account information, for payment from an account associated with the payment object, of a certain amount owed; electronically communicating, by the second party for receipt by a third party, both account information representative of information read from the payment object that was presented for payment, and an identification of the second party; and electronically receiving, by the second party in response to the electronic communication to the third party, data that is indicative of a gratuity to be charged against an account associated with the payment object that was presented for payment.

In another aspect of the invention, a method includes the steps of: receiving, from a first party by a second party, a payment object bearing account information, for payment from an account associated with the payment object, of a certain amount owed; electronically communicating, by the second party for receipt by a third party, both account information representative of information read from the payment object that was presented for payment, and an identification of the second party; electronically receiving, by the second party in response to the electronic communication to the third party, data that is indicative of a gratuity to be charged against an account associated with the payment object that was presented for payment; printing, by the second party, a document that includes both the certain amount owed, and the gratuity as indicated by the data received by the second party from the third party; and presenting, by the second party to the first party, the printed document for signature by the first party.

In a feature of this aspect, the method further includes signing, by the first party, the printed documented presented by the second party.

In a feature of this aspect, the method further includes receiving, from the first party by the second party, the printed documented signed by the first party.

In a feature of this aspect, the step of printing a document that includes both (i) the certain amount owed, and (ii) the gratuity as indicated by the data received by the second party from the third party, further includes printing a sum of the certain amount owed and the gratuity.

In a feature of this aspect, the step of printing a document (which includes both (i) the certain amount owed, and (ii) the gratuity as indicated by the data received by the second party from the third party) further includes printing a solicitation of an alternative gratuity to be charged against an account associated with the payment object that was presented for payment, and wherein the step of presenting the printed document for signature further includes presenting the printed document for selection of the alternative gratuity by the first party. The step of printing a document (which includes both (i) the certain amount owed, and (ii) the gratuity as indicated by the data received by the second party from the third party) further may include printing a sum of the certain amount owed and the alternative gratuity.

In a feature of this aspect, the step of printing a document (which includes both (i) the certain amount owed, and (ii) the gratuity as indicated by the data received by the second party from the third party) further includes printing a solicitation of an write-in gratuity to be charged against an account associated with the payment object that was presented for payment, and wherein the step of presenting the printed document for signature further includes presenting the printed document for selection of the write-in gratuity by the first party. The step of printing a document (which includes both (i) the certain amount owed, and (ii) the gratuity as indicated by the data received by the second party from the third party) further may include printing a space for receiving a sum of the certain amount owed and the write-in gratuity.

In a feature of this aspect, the method further includes electronically communicating, by the second party, a sum of the certain amount owed and the gratuity to be charged against the account associated with the payment object in accordance with the signed document received by the second party from the first party. The method may further include sending an alert to the account holder if the gratuity to be charged against the account associated with the payment object does not equal the gratuity indicated by data received by the second party from the third party. Alternatively, the method may further include sending an alert to the account holder if the gratuity to be charged against the account associated with the payment object differs from the gratuity indicated by data received by the second party from the third party by a predetermined threshold. The predetermined threshold may be set by the holder of the account.

In a feature of this aspect, the first party is the account holder.

In a feature of this aspect, the first party is an authorized user of the payment object.

In a feature of this aspect, the second party is a merchant.

In a feature of this aspect, the second party is a service provider.

In a feature of this aspect, the identification of the second party uniquely identifies the second party to the third party.

In a feature of this aspect, the identification of the second party identifies a category of services provided by the second party.

In a feature of this aspect, the identification of the second party identifies the second party to the third party as being a provider of restaurant services.

In a feature of this aspect, the identification of the second party identifies the second party to the third party as being a provider of salon services.

In a feature of this aspect, the identification of the second party identifies the second party to the third party as being a provider of spa services.

In a feature of this aspect, the identification of the second party identifies the second party to the third party as being a provider of taxi services.

In a feature of this aspect, the identification of the second party identifies the second party to the third party as being a provider of limousine services.

In a feature of this aspect, the identification of the second party identifies the second party to the third party as being a provider of massage services.

In a feature of this aspect, the third party is an issuer of the payment object.

In a feature of this aspect, the third party is a provider of a financial transaction network.

In a feature of this aspect, the method further includes electronically communicating, by the second party to the third party, data representative of the certain amount owed.

In a feature of this aspect, the method further includes electronically communicating, by the second party to a fourth party, for authorization of a charge to the account of the account holder, data representative of the certain amount owed, account information representative of information acquired from the payment object that was presented for payment, and an identification of the second party to the fourth party. The method may further include electronically receiving, by the second party, an authorization for a charge to the account of the account holder.

In a feature of this aspect, the payment object that is presented is a credit card that is associated with the account of the account holder.

In a feature of this aspect, the payment object that is presented is a charge card that is associated with the account of the account holder.

In a feature of this aspect, the payment object that is presented is a debit card that is associated with the account of the account holder.

In a feature of this aspect, the payment object that is presented is a stored-value card that is associated with the account of the account holder.

In a feature of this aspect, the information is transmitted over a switched telephone network.

In a feature of this aspect, the information is transmitted over a public switched telephone network (PSTN).

In a feature of this aspect, the information is transmitted over the Internet.

In a feature of this aspect, the information is transmitted over a financial transaction processing network.

In another aspect of the invention, a method includes the steps of: receiving, from a customer by a merchant, a card for payment from an account associated with the card of a certain amount owed; electronically communicating, by the merchant for receipt by a card issuer for authorization to charge, to the account associated with the card, the certain amount owed, card information representative of information read from the card that was presented for payment, an identification of the merchant, and the certain amount owed; and electronically receiving, by the merchant in response to the electronic communication to the card issuer, (i) authorization to charge the certain amount owed to the account associated with the card and (ii) data that is indicative of a gratuity to be charged to the account associated with the card.

In still another aspect of the invention, a method includes the steps of: receiving, from a customer by a merchant, a card for payment from an account associated with the card of a certain amount owed; electronically communicating, by the merchant for receipt by a card issuer for authorization to charge, to the account associated with the card, the certain amount owed, card information representative of information read from the card that was presented for payment, an identification of the merchant, and the certain amount owed; electronically receiving, by the merchant in response to the electronic communication to the card issuer, (i) authorization to charge the certain amount owed to the account associated with the card and (ii) data that is indicative of a gratuity to be charged to the account associated with the card; printing, by the merchant, a document that includes both (i) the certain amount owed and (ii) the gratuity as indicated by the data received by the merchant from the card issuer; and presenting, by the merchant to the customer, the printed document for signature by the customer.

In a feature of this aspect, the method further includes signing, by the customer, the printed documented presented by the merchant.

In a feature of this aspect, the method further includes receiving, from the customer by the merchant, the printed documented signed by the customer. The step of printing a document (which includes both (i) the certain amount owed, and (ii) the gratuity as indicated by the data received by the merchant from the card issuer) may further include printing a sum of the certain amount owed and the gratuity. The step of printing a document (which includes both (i) the certain amount owed, and (ii) the gratuity as indicated by the data received by the merchant from the card issuer) may further include printing a solicitation of an alternative gratuity to be charged against the account associated with the card, and the step of presenting the printed document for signature further may include presenting the printed document for selection of the alternative gratuity by the customer. In this scenario, a sum of the certain amount owed and the alternative gratuity also may be printed.

In a feature of this aspect, the step of printing the document (which includes both (i) the certain amount owed, and (ii) the gratuity as indicated by the data received by the merchant from the card issuer) further includes printing a solicitation of an write-in gratuity to be charged against the account associated with the card, and wherein the step of presenting the printed document for signature further includes presenting the printed document for selection of the write-in gratuity by the customer. Furthermore, a space may be printed for receiving a sum of the certain amount owed and the write-in gratuity.

In a feature of this aspect, the method further includes electronically communicating, by the merchant, a sum of the certain amount owed and the gratuity to be charged against the account associated with the card in accordance with the signed document received by the merchant from the customer. Additionally, an alert may be sent to the account holder if the gratuity to be charged against the account associated with the card does not equal the gratuity indicated by data received by the merchant from the card issuer. Alternatively, an alert may be sent to the account holder if the gratuity to be charged against the account associated with the card differs from the gratuity indicated by data received by the merchant from the card issuer by a predetermined threshold. The predetermined threshold may be set by the holder of the account.

In a feature of this aspect, the customer is the account holder.

In a feature of this aspect, the customer is an authorized user of the card.

In a feature of this aspect, the merchant is a service provider.

In a feature of this aspect, the identification of the merchant uniquely identifies the merchant to the card issuer.

In a feature of this aspect, the identification of the merchant identifies a category of services provided by the merchant.

In a feature of this aspect, the identification of the merchant identifies the merchant to the card issuer as being a provider of restaurant services.

In a feature of this aspect, the identification of the merchant identifies the merchant to the card issuer as being a provider of salon services.

In a feature of this aspect, the identification of the merchant identifies the merchant to the card issuer as being a provider of spa services.

In a feature of this aspect, the identification of the merchant identifies the merchant to the card issuer as being a provider of taxi services.

In a feature of this aspect, the identification of the merchant identifies the merchant to the card issuer as being a provider of limousine services.

In a feature of this aspect, the identification of the second party identifies the second party to the card issuer as being a provider of massage services.

In a feature of this aspect, the card that is presented is a credit card that is associated with the account of the account holder.

In a feature of this aspect, the card that is presented is a charge card that is associated with the account of the account holder.

In a feature of this aspect, the card that is presented is a debit card that is associated with the account of the account holder.

In a feature of this aspect, the card that is presented is a stored-value card that is associated with the account of the account holder.

In a feature of this aspect, the network comprises a switched telephone network.

In a feature of this aspect, the network comprises a public switched telephone network (PSTN).

In a feature of this aspect, the network comprises the Internet.

In a feature of this aspect, the network comprises a financial transaction processing network.

In another aspect, a method includes steps of: receiving, from a first party by a second party, a payment object bearing account information, for payment from an account associated with the payment object, of a certain amount owed; electronically communicating, by the second party for receipt by a third party, both (i) account information representative of information read from the payment object that was presented for payment and (ii) an identification of the second party; and electronically receiving, by the second party in response to the electronic communication to the third party, data that is indicative of a gratuity to be charged against an account associated with the payment object that was presented for payment. In features of this aspect include: presenting on a display, by the second party, an image of a document for review by the first party, the document including both (i) the certain amount owed and (ii) the gratuity as indicated by the data received by the second party from the third party; and electronically capturing a signature of the first party signifying approval of the certain amount owed and the gratuity as indicated by the data received by the second party from the third party; and printing a receipt including the certain amount owed, the gratuity as indicated by the data received by the second party from the third party, and the electronically captured signature of the first party.

In another aspect, a method includes steps of: receiving, from a first party by a second party, a payment object bearing account information, for payment from an account associated with the payment object, of a certain amount owed; electronically communicating, by the second party for receipt by a third party, both (i) account information representative of information read from the payment object that was presented for payment and (ii) an identification of the second party; electronically receiving, by the second party in response to the electronic communication to the third party, data that is indicative of a gratuity to be charged against an account associated with the payment object that was presented for payment; presenting on a display, by the second party, an image of a document for review by the first party, the document including both (i) the certain amount owed and (ii) the gratuity as indicated by the data received by the second party from the third party; electronically capturing a signature of the first party signifying approval of the certain amount owed and the gratuity as indicated by the data received by the second party from the third party; and printing a receipt including the certain amount owed, the gratuity as indicated by the data received by the second party from the third party, and the electronically captured signature of the first party.

In a feature of this aspect, the step of presenting an image of the document includes presenting an image of a document that further includes a sum of the certain amount owed and the gratuity as indicated by the data received by the second party from the third party.

In a feature of this aspect, the method further includes presenting a solicitation of an alternative gratuity to be charged against an account associated with the payment object that was presented for payment. The solicitation preferably includes an object that is displayed and that is selectable by the first party. In this instance, the method further preferably includes the steps of receiving an alternative gratuity amount from the first party, in substitution for the gratuity as indicated by the data received by the second party from the third party, upon selection of the displayed object by the first party; substituting the alternative gratuity amount for the gratuity as indicated by the data received by the second party from the third party; and electronically communicating, by the second party, the certain amount owed and the alternative gratuity amount for authorization. Alternatively, or additionally, the method preferably includes the steps of presenting a suggested alternative gratuity amount in association with the displayed object of the solicitation; upon selection of the displayed object by the first party, substituting the alternative gratuity amount for the gratuity as indicated by the data received by the second party from the third party; and electronically communicating, by the second party, the certain amount owed and the alternative gratuity amount for authorization.

In another aspect of the invention, a point of sale (POS) terminal for use by a merchant in processing electronic transactions includes: a first interface configured to receive card information acquired from cards associated with accounts held at card issuers, and a second interface configured to electronically communicate over a network with each of the card issuers. In accordance with this aspect, the POS terminal is configured to electronically send, through the second interface, over the network, to a particular one of the card issuers, card information received through the first interface and acquired from a card issued by the particular card issuer, an identification of the merchant, and the certain amount owed; and electronically receive and process, through the second interface, over the network, from the particular card issuer, an authorization to charge to the account associated with the card the certain amount owed, and data that is indicative of a gratuity to be charged to the account associated with the card.

In another feature of this aspect, the POS terminal includes a controller and is specifically configured to process electronic transactions representing payment from accounts for goods or services in association with which gratuities may be given. The controller may be a microcontroller; an integrated circuit; or a computer processor. In this regard, the POS terminal preferably includes machine-readable medium containing machine-executable instructions for performing a method comprising the steps of: electronically sending, through the second interface, over the network, to a particular one of the card issuers, card information received through the first interface and acquired from a card issued by the particular card issuer, an identification of the merchant, and the certain amount owed; and electronically receiving, through the second interface, over the network, from the particular card issuer, an authorization to charge to the account associated with the card the certain amount owed, and data that is indicative of a gratuity to be charged to the account associated with the card.

In still another aspect of the invention, a point of sale (POS) terminal for use by a merchant in processing electronic transactions includes: a first interface configured to receive card information acquired from cards associated with accounts held at card issuers, a second interface configured to electronically communicate over a network with each of the card issuers; and a printer component configured to print a document. In accordance with this aspect, the POS terminal is configured to electronically send, through the second interface, over the network, to a particular one of the card issuers, card information received through the first interface and acquired from a card issued by the particular card issuer, an identification of the merchant, and the certain amount owed; electronically receive, through the second interface, over the network, from the particular card issuer, an authorization to charge to the account associated with the card the certain amount owed, and data that is indicative of a gratuity to be charged to the account associated with the card; and cause the printer component to print a document that includes both the certain amount owed, and the gratuity as indicated by the data received by the merchant from the particular card issuer.

In a feature of this aspect, the POS terminal includes a controller and is specifically configured to process electronic transactions representing payment from accounts for goods or services in association with which gratuities may be given. The controller may be a microcontroller; an integrated circuit; or a computer processor. In this regard, the POS terminal preferably includes machine-readable medium containing machine-executable instructions for performing a method. The method includes the steps of: electronically sending, through the second interface, over the network, to a particular one of the card issuers, card information received through the first interface and acquired from a card issued by the particular card issuer, an identification of the merchant, and the certain amount owed; electronically receiving, through the second interface, over the network, from the particular card issuer, an authorization to charge to the account associated with the card the certain amount owed, and data that is indicative of a gratuity to be charged to the account associated with the card; and causing the printer component to print a document that includes both, the certain amount owed, and the gratuity as indicated by the data received by the merchant from the particular card issuer.

In a feature of this aspect, the POS terminal includes a keypad through which a user may input an amount owed.

In a feature of this aspect, the network comprises a switched telephone network.

In a feature of this aspect, the network comprises a public switched telephone network (PSTN).

In a feature of this aspect, the network comprises the Internet.

In a feature of this aspect, the network comprises a financial transaction processing network.

In another aspect of the invention, a computer is specifically configured as a point of sale (POS) terminal for use by a merchant in processing electronic transactions. The computer includes: a first interface configured to receive card information acquired from cards associated with accounts held at card issuers; a second interface configured to electronically communicate over a network with each of the card issuers; a printer component configured to print a document; and computer-readable medium containing computer-executable instructions for performing a process comprising the steps of: electronically sending, through the second interface, over the network, to a particular one of the card issuers, card information received through the first interface and acquired from a card issued by the particular card issuer, an identification of the merchant, and the certain amount owed; and electronically receiving, through the second interface, over the network, from the particular card issuer, an authorization to charge to the account associated with the card the certain amount owed, and data that is indicative of a gratuity to be charged to the account associated with the card.

In another aspect of the invention, a computer is specifically configured as a point of sale (POS) terminal for use by a merchant in processing electronic transactions. The computer includes: a first interface configured to receive card information acquired from cards associated with accounts held at card issuers; a second interface configured to electronically communicate over a network with each of the card issuers; a printer component configured to print a document; and computer-readable medium containing computer-executable instructions for performing a process comprising the steps of: electronically sending, through the second interface, over the network, to a particular one of the card issuers, card information received through the first interface and acquired from a card issued by the particular card issuer, an identification of the merchant, and the certain amount owed; electronically receiving, through the second interface, over the network, from the particular card issuer, an authorization to charge to the account associated with the card the certain amount owed, and data that is indicative of a gratuity to be charged to the account associated with the card; and causing the printer component to print a document that includes both the certain amount owed, and the gratuity as indicated by the data received by the merchant from the particular card issuer.

In a feature of this aspect, the computer configured as a point of sale (POS) terminal further includes a keypad through which a user may input an amount owed. The keyboard may include a card reader component for acquiring card information from magnetic stripes of cards. The keyboard may include, additionally or alternatively, a card reader component for wirelessly acquiring card information from wireless transmitters of cards.

In a feature of this aspect, the network comprises a switched telephone network.

In a feature of this aspect, the network comprises a public switched telephone network (PSTN).

In a feature of this aspect, the network comprises the Internet.

In a feature of this aspect, the network comprises a financial transaction processing network.

In an aspect of the invention, a method includes the step of maintaining, in a computer database, account information carried by a payment object in association with data indicative of a gratuity to be charged against an account associated with the payment object. The method also includes the steps of electronically receiving, over a network, account information acquired from the payment object and an identification of a party, which party has been presented the payment object for a payment of a certain amounted owed; electronically accessing, from the computer database, data indicative of a gratuity to be charged against the account associated with the payment object; and electronically communicating, over the network, data indicative of a gratuity to be charged against the account associated with the payment object. Preferably, the method is performed by a server that is configured for electronic communications via a financial transaction processing network, which may include a public switched telephone network (PSTN) and/or the Internet.

In a feature of this aspect, the method further includes maintaining merchant codes, representative of merchants to which a payment object can be presented, in association with data indicative of respective gratuities to be paid to the merchants. The method may further include the step of changing, by a holder of the account associated with a payment object for which account information is maintained in the computer database, one or more of the respective gratuities to be paid to the merchants; and the step of providing a web interface, accessible over the Internet, by which the holder of the account associated with the payment object changes the one or more respective gratuities to be paid to the merchants from the account of the account holder.

In a feature, the method further includes the step of providing a web interface, accessible over the Internet, by which a holder of the account associated with the payment object provides an indication of a gratuity to be charged against such account.

In a feature, the method further includes the step of providing a web interface, accessible over the Internet, by which a holder of the account associated with the payment object provides an indication of a gratuity to be charged against such account for a particular category of service.

In a feature, the method further includes the step of providing a web interface, accessible over the Internet, by which a holder of the account associated with the payment object provides an indication of a gratuity to be charged against such account when a payment is made to a particular service provider.

In a feature, the method further includes the step of maintaining data indicative of a gratuity for each of a plurality of different types of services for which a gratuity is customarily given.

In a feature, the method further includes the step of maintaining data indicative of a gratuity for each of a plurality of specific service providers.

In a feature, the data indicative of a gratuity that is maintained in the database represents a percentage that is applied to a certain amount owed for calculating the gratuity to be charged.

In a feature, the data indicative of a gratuity that is maintained in the database represents a percentage of a certain amount owed, and rounded to the nearest whole dollar, for calculating the gratuity to be charged.

In a feature, the data indicative of a gratuity that is maintained in the database represents a percentage of a certain amount owed, and rounded to the nearest whole or half dollar, for calculating the gratuity to be charged.

In a feature, the data indicative of a gratuity that is maintained in the database represents a percentage of a certain amount owed, and rounded to a predetermined penny amount, for calculating the gratuity to be charged. The predetermined penny amount is set by the account holder, and the predetermined penny amount may be set by the account holder by specifying an algorithm for determining the penny amount. In such scenario, the algorithm may include incrementing the penny amount of the previous gratuity paid by a cent, such that transactions with gratuities that are paid with the payment object can be sequentially counted on statements for the account.

In a feature, the method further includes the steps of maintaining a default percentage for a particular type of service and applying the default percentage in the absence of maintained data indicative of a gratuity for the particular type of service. The default percentage may be established by a holder of the account with which the payment object is associated, or the default percentage may not established by a holder of the account with which the payment object is associated and, instead, established by a card issuer or by a provider of a financial transaction processing network.

In a feature, the method further includes the steps of establishing a default percentage for a specific service provider for the particular type of service, and applying the default percentage in the absence of maintained data indicative of a gratuity for the specific service provider for the particular type of service. The indication may be established by a holder of the account with which the payment object is associated and may be received from the account holder over the Internet. Alternatively, the default percentage may not be established by a holder of the account with which the payment object is associated.

In a feature, the method further includes receiving, from a holder of the account with which the payment object is associated, an indication of a gratuity for a particular type of service to be charged against the account associated with the payment object. The indication may be received from the account holder over the Internet.

In a feature, the method further includes receiving, from a holder of the account with which the payment object is associated, an indication of a gratuity for a particular service provider to be charged against the account associated with the payment object. The indication may be received from the account holder over the Internet.

In a feature, the method further includes electronically receiving, over the network, a sum of the certain amount owed and the gratuity to be charged against the account associated with the payment object. The method also further may include the step of sending an alert, to an account holder of the account with which the payment object is associated, if the gratuity to be charged against the account associated with the payment object does not equal the gratuity indicated by the maintained data indicative of a gratuity that is electronically communicated; or, alternatively, the step of sending an alert to an account holder of the account if the gratuity to be charged against the account associated with the payment object differs by a predetermined threshold from the gratuity indicated by the maintained data indicative of a gratuity that is electronically communicated, in which scenario the predetermined threshold may set by the holder of the account.

In a feature, the steps of this aspect are performed by an issuer of the payment object, with which issuer the account is held or, alternatively, are performed by a provider of the financial transaction processing network.

In a feature, the party presented with the payment object is a service provider.

In a feature, the method further includes the steps of electronically receiving, over the network, data representative of a certain amount owed; and electronically communicating, over the network, an authorization for the charging of the certain amount owed, plus the gratuity as indicated by the electronically accessed data, to the account associated with the payment object.

In a feature, the payment object that is presented is a credit card that is associated with the account of the account holder.

In a feature, the payment object that is presented is a charge card that is associated with the account of the account holder.

In a feature, the payment object that is presented is a debit card that is associated with the account of the account holder.

In a feature, the payment object that is presented is a stored-value card that is associated with the account of the account holder.

In a feature, the network comprises a switched telephone network.

In a feature, the network comprises a public switched telephone network (PSTN).

In a feature, the network comprises the Internet.

In a feature, the network comprises a financial transaction processing network.

In still yet another aspect of the invention, a method allowing a patron to set a percentage gratuity amount to automatically add to credit transactions includes the steps of: setting a percentage for an establishment; receiving notification of a transaction; identifying the establishment; retrieving patron's setting of gratuity; calculating gratuity of the transaction; recalculating total transaction; transmitting total to establishment; and reconciling the transaction.

In a feature of this aspect, the step of setting the percentage for the certain establishment further includes the step of setting a standard gratuity percentage for establishments not specifically set by the patron, and may further include the step of prompting the patron to set the standard gratuity percentage. The step of prompting the patron to set a standard gratuity percentage may include prompting the patron to set a standard gratuity percentage for categories of establishments such as restaurants, bars, and salons.

In a feature of this aspect, the method further includes maintaining a listing of codes for all establishments to which the credit transactions are applicable.

In a feature of this aspect, the step of receiving notification of a transaction further includes electronic notification by telephone line, Internet connection, or wireless connection, that a credit card transaction may occur.

In a feature of this aspect, the step of transmitting the total to the establishment further comprises transmitting the total before prompting the establishment to get a signature.

In a feature of this aspect, the step of transmitting the total to the establishment further comprises transmitting the total after prompting the establishment to get a signature.

In a feature of this aspect, the step of transmitting the total to the establishment further comprises electronic transmission by telephone line, internet connection, or wireless connection.

In another aspect of the invention, a system for allowing a patron to set a percentage gratuity amount for certain establishments which is added automatically to the patron's credit transaction includes: instructions for setting a percentage for an establishment; instructions for notifying patron's credit company of a transaction by an establishment that is charging a patron's account; instructions for identifying the establishment that is charging a patron's account; instructions for retrieving the patron's settings for gratuity of the establishment that is charging a patron's account; instructions for calculating the gratuity of the transaction associated with the patron's settings for gratuity of the establishment that is charging a patron's account; instructions for recalculating the total charge on the patron's account of the establishment that is charging a patron's account; instructions for transmitting the total charge to the establishment that is charging a patron's account; instructions for reconciling the transaction. The instruction may comprise software instructions saved in a computer-readable medium including an optical disk or memory.

In a feature, the method further includes the step of setting a standard gratuity percentage for establishments not specifically set by the patron.

In a feature, the method further includes the step of prompting the patron to set the standard gratuity percentage.

In a feature of foregoing aspects of the invention, the certain amount owed comprises a principal amount and a tax amount.

In another feature of foregoing aspects of the invention, electronically sending the certain amount, through the second interface, over the network, to a particular one of the card issuers comprises electronically sending, through the second interface, over the network, to a particular one of the card issuers, a principal amount and a tax amount. A total amount further may be included.

In each of additional aspects of the invention, a machine-readable medium contains machine-executable instructions for performing a respective method in accordance with any of the foregoing aspects, including any of the foregoing features.

In addition to the aforementioned aspects and features of the present invention, it should be noted that the present invention further encompasses the various possible combinations and subcombinations of such aspects and features.

Additionally, in accordance with an aspect of an alternative present invention, a method includes the steps of: receiving, from a first party by a second party, a payment object bearing account information, for payment from an account associated with the payment object, of a certain amount owed; electronically communicating, by the second party for receipt by a third party, both (i) account information representative of information read from the payment object that was presented for payment and (ii) an identification of the second party; electronically receiving, by the second party in response to the electronic communication to the third party, data that is indicative of gratuity percentages predetermined by the first party; printing, by the second party, a document that includes (i) the predetermined gratuity percentages, and corresponding gratuity amounts and respective grand totals, for copying by the first party in completing the document, (ii) a place for writing in of a gratuity, and (iii) a place line for writing in of the total of the gratuity and the certain amount owed; and presenting, by the second party to the first party, the printed document for completion of the document and signing by the first party.

In accordance with another aspect of the alternative present invention, a method includes the steps of: receiving, from a first party by a second party, a payment object bearing account information, for payment from an account associated with the payment object, of a certain amount owed; electronically communicating, by the second party for receipt by a third party, both (i) account information representative of information read from the payment object that was presented for payment and (ii) an identification of the second party; electronically receiving, by the second party in response to the electronic communication to the third party, data that is indicative of gratuity percentages predetermined by the first party; presenting on a display the predetermined gratuity percentages and the corresponding gratuity amounts and respective grand totals for selection by the first party in completing the transaction; upon selection of a gratuity by the first party, electronically capturing a signature of the first party, thereby signifying approval of the certain amount owed, the selected gratuity percentage and corresponding gratuity amount and grand total; and printing a document for the first party including the selected gratuity, the grand total, and the customer's electronically captured signature.

In each of additional aspects of the alternative present invention, a machine-readable medium contains machine-executable instructions for performing a respective method in accordance with any of the foregoing two aspects. Moreover, it should be noted that the alternative present invention further encompasses the various possible combinations and subcombinations of these aspects with the foregoing features of the present invention, where not inconsistent with the alternative present invention.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 1 is an illustration of a sales receipt for restaurant services bearing a "Quick Guide" table for leaving a gratuity that is specific to the amount of the restaurant services set forth on the sales receipt.

FIG. 2 is an illustration of a credit card slip for payment of the restaurant services of the sales receipt of FIG. 1, which also bears the same "Quick Guide" table for leaving a gratuity that is specific to the amount of the restaurant services being paid.

FIG. 5 illustrates an exemplary sales receipt printed in accordance with the credit card payment system 65 of FIG. 4.

FIG. 6 illustrates an exemplary credit card slip printed in accordance with the credit card payment system 65 of FIG. 4.

FIG. 10 is an illustration of an exemplary method performed by a merchant in accordance with one or more preferred embodiments of the invention.

FIG. 11 is an illustration of an exemplary method performed by a merchant in accordance with one or more preferred embodiments of the invention.

FIG. 15 is an exemplary web interface for setting, viewing, and changing gratuities by an account holder in accordance with one or more preferred embodiments of the invention.

FIG. 16 is another view of an exemplary web interface for setting, viewing, and changing gratuities by an account holder in accordance with one or more preferred embodiments of the invention.

FIG. 17 is another view of an exemplary web interface for setting, viewing, and changing gratuities by an account holder in accordance with one or more preferred embodiments of the invention.

FIG. 18 is another view of an exemplary web interface for setting, viewing, and changing gratuities by an account holder in accordance with one or more preferred embodiments of the invention.

FIG. 20 is an illustration of a credit card slip in accordance with an alternative present invention.

DETAILED DESCRIPTION

Figure 3:
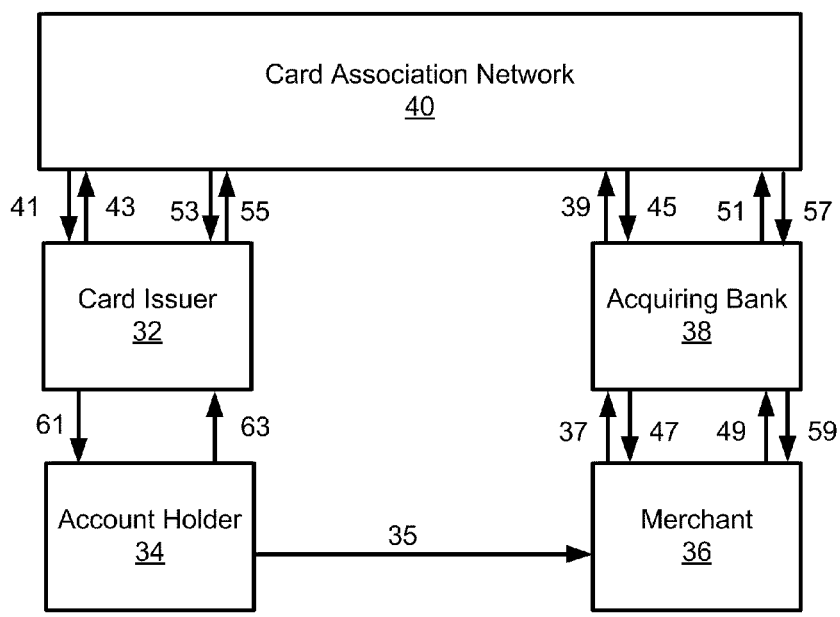
FIG. 3 is an illustration of a conventional credit card payment system 30.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

One or more preferred embodiments of the present invention are next described. The following description of one or more preferred embodiments is merely exemplary in nature and is in no way intended to limit the invention, its implementations, or uses.

Conventional Credit Card Payment System

Turning now to FIG. 3, a conventional payment system 30 is illustrated as it is currently understood, wherein credit cards are utilized. The credit cards may be ones bearing the VISA, MASTERCARD, DISCOVER, or AMERICAN EXPRESS marks; however, it is believed that the following description is generally equally applicable to other credit cards (including secured credit cards) as well as to charge cards, stored-value cards (including gift cards and prepaid cards), rebate cards, and the like which may be used to pay for goods and services, and gratuities therefor. Payment systems for such other cards may vary in certain respects, but in may respects are generally similar to the payment system 30 of FIG. 3, and the variations in such systems are known and well understood by the Ordinary Artisan.

In the payment system 30, a card issuer 32—such as a bank—has issued a credit card to an account holder 34, who has opened a credit card account with the card issuer 32. Additionally, a merchant 36 has established an account with an acquiring bank 38 through which amounts charged on credit cards for the merchant's goods, services, or both are credited to the account of the merchant 36.

Thereafter, the account holder 34 presents the credit card to a merchant 36 for payment of an amount owed for goods, services, or both. The merchant 36, in turn, reads 35 account information from the card using a point-of-sale (POS) terminal and electronically communicates 37 the account information, amount owed, and an identification of the merchant 36 to the acquiring bank 38 over a network. Typically, the network is a public-switched telephone network (PSTN); in other implementations, however, the network may include the Internet. The acquiring bank 38, in turn, electronically communicates 39 the account information, amount owed, and an identification of the merchant 36 to a card association 40 (e.g., Visa or MasterCard), which electronically communicates 41 this information to the card issuer 32. In communicating this information, a financial transaction processing network is utilized and may include communications over a PSTN, the Internet, or both.

The card issuer 32 receives and verifies that the card is valid and that there is sufficient credit in the account associated with the card to cover the amount to be paid to the merchant 36. If the verification is successful, the card issuer 32 electronically communicates 43 an authorization code to the card association 40, which in turn electronically communicates 45 the authorization code to the acquiring bank 38. The acquiring bank 38, in turn, electronically communicates 47 the authorization code to the merchant 36, which signifies approval of the electronic charge transaction.

Typically, documentation of the transaction is printed on a slip of paper, and the account holder 34 signs the slip, thereby indicating confirmation and approval of the transaction. Alternatively, the transaction information is presented to the account holder 34 on a display screen, and the signature of the account holder 34 is electronically captured to indicate review and approval of the transaction.

The transaction then may be closed out by the merchant 36 with other transactions at the end of the day in a process that is referred to in the industry as "batching". Upon closeout, the acquiring bank 38 initiates the process of transferring funds from the card issuer 32 to the acquiring bank 38. Of course, fees are deducted by each of the card issuer 32, card association 40, and acquiring bank 38 during the fund transfer processes.

Importantly, if the transaction includes payment for goods or services for which a gratuity is normally given, the account holder 34 typically has the opportunity to add a gratuity to the slip by way of a printed line on which a gratuity may be written by hand. A second printed line is provided for totaling both the amount paid for the goods, services, or both, and the written-in gratuity.

In this scenario, once the total is calculated and the signature of the account holder 34 has been obtained, the merchant 36 authorizes the new total. In this respect, the merchant 36 again electronically communicates 49 the account information, new total, and an identification of the merchant 36 to the acquiring bank 38 over the network; and the acquiring bank 38 electronically communicates 51 the account information, new total, and an identification of the merchant 36 to the card association 40, which electronically communicates 53 this information to the card issuer 32. The card issuer 32 receives and again verifies that the card is valid and that there is sufficient credit in the account associated with the card to cover the new total to be paid to the merchant 36. Sufficient information also is sent in these communications so that the card issuer is aware that the new total for which an authorization code is sought corresponds to a prior, authorized transaction, and that the new total replaces the amount of such prior, authorized transaction.

If this second verification is successful, the card issuer 32 electronically communicates 55 an authorization code to the card association 40, which in turn electronically communicates 57 the authorization code to the acquiring bank 38. The acquiring bank 38, in turn, electronically communicates 59 the authorization code to the merchant 36, thereby signifying approval of the electronic charge transaction with the new total. Thereafter, the merchant 36 typically closes out the electronic charge transaction during batching.

Eventually—usually monthly—the card issuer 32 sends 61 a statement to the account holder 34 for all current transactions charged to the account, and the account holder 34 sends 63 payment on the account to the card issuer 32.

A Preferred Credit Card Payment System of the Invention

Figure 4:
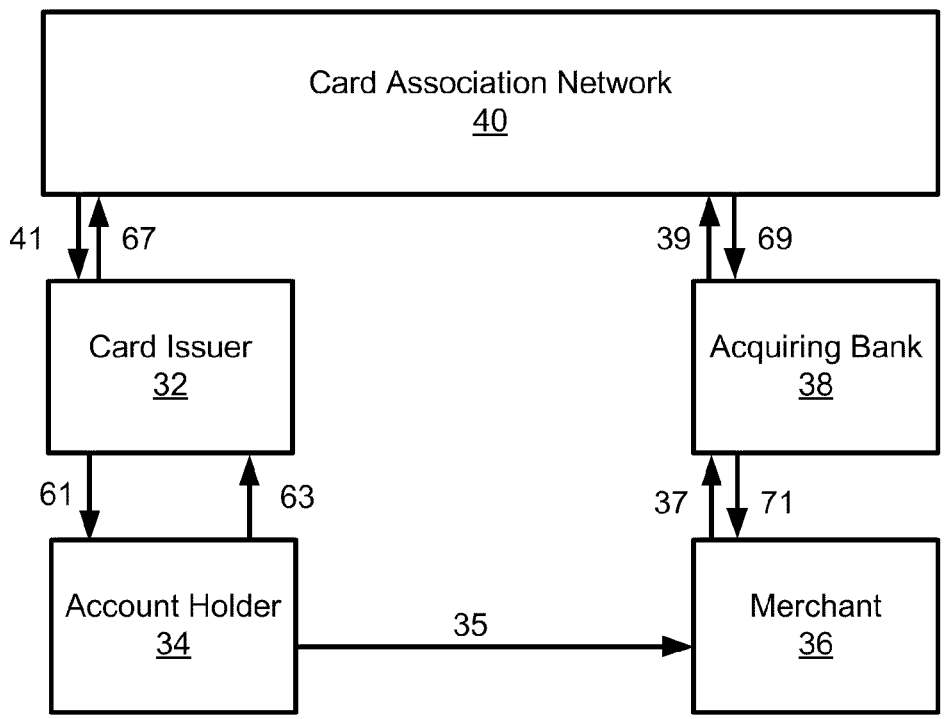
FIG. 4 is an illustration of a preferred credit card payment system 65 in accordance with a preferred embodiment of the present invention.

Turning now to FIG. 4, a preferred payment system 65 is illustrated in accordance with the present invention, wherein credit cards are utilized. The credit cards may be ones bearing the VISA, MASTERCARD, DISCOVER, or AMERICAN EXPRESS marks; however, the present invention is equally applicable to other credit cards (including secured credit cards) as well as to charge cards, stored-value cards (including gift cards and prepaid cards), rebate cards, and the like which may be used to pay for goods and services, and gratuities therefor.

In the payment system 65, a card issuer 32—such as a bank—has issued a credit card to an account holder 34, who has opened a credit card account with the card issuer 32. Additionally, a merchant 36 has established an account with an acquiring bank 38 through which amounts charged on credit cards for the merchant's goods, services, or both are credited to the account of the merchant 36.

Thereafter, the account holder 34 presents the credit card to a merchant 36 for payment of an amount owed for goods, services, or both. Furthermore, it is assumed that the transaction includes payment for goods or services, or both, for which a gratuity is normally given. For instance, the merchant may be a provider of restaurant services; salon services; spa services; taxi services; limousine services; or massage services, charges for each of which commonly include gratuities.

Upon being presented the card, the merchant 36 reads 35 account information from the card using a point-of-sale (POS) terminal and electronically communicates 37 the account information, amount owed (preferably including both a principal amount owed and an amount of tax owed, and possibly including a total amount owed as well, although in alternative embodiments only a total amount owed may be communicated), and an identification of the merchant 36 to the acquiring bank 38 over a public-switched telephone network. The acquiring bank 38, in turn, electronically communicates 39 the account information, amount owed, and an identification of the merchant 36 to a card association 40 (e.g., Visa or MasterCard), which electronically communicates 41 this information to the card issuer 32.

Upon receipt of this information, the card issuer 32 identifies that the transaction is the type of transaction that customarily includes a gratuity. The card issuer 32 identifies the transaction as such preferably based on this information that is communicated, and may identify the transaction as such specifically based on the identification of the merchant 36. In this respect, the card issuer 32 preferably has predetermined the type of transactions for the merchant 36 based on the known product, service, or both, provided by the merchant 36, or otherwise is able to determine the type of transactions for the merchant 36, such as by querying a database of merchant identifications that may be maintained for such purpose, either by a third party or even by the card association 40. Alternatively, data in this information may identify the type of service or good, or both, for which a gratuity applies, or specifically may identify a level of gratuity applicable to the type of the transaction.

After identifying the transaction as being a transaction for which a gratuity is applicable, the card issuer 32 preferably determines a gratuity amount and automatically authorizes the total of the transaction amount received and the determined gratuity amount. The gratuity amount preferably is determined by the card issuer 32 by multiplying the principal transaction amount received (i.e., not including the received tax amount, although in alternative embodiments the total amount, including tax, may be utilized) by a gratuity percentage applicable to the merchant 36 or to the type of the transaction, as identified by the card issuer 32. In this respect, the gratuity percentage preferably is a default gratuity percentage that is established by the card issuer 32 for each type of transaction for which a gratuity is applicable; furthermore, such established gratuity percentage preferably is preapproved by the account holder 34 prior to its use. Alternatively, the gratuity percentage that is used is one that has been established by the account holder 34 for the particular type of transaction being authorized, or for the specific merchant 36.

Upon verifying that the card is valid and that there is sufficient credit in the account associated with the card to cover the transaction amount plus the determined gratuity amount, the card issuer 32 electronically communicates 67 an authorization code and the determined gratuity amount to the card association 40, which in turn electronically communicates 69 the authorization code and determined gratuity amount to the acquiring bank 38. The acquiring bank 38, in turn, electronically communicates 71 the authorization code and determined gratuity amount to the merchant 36, thereby signifying approval of the electronic charge transaction.

The POS terminal receiving the authorization code and determined gratuity amount preferably prints a slip documenting the transaction, which slip includes not only the amount to be paid for the goods, services, or both of the merchant 36, but also the determined gratuity amount and the grand total to be charged to the account associated with the card. Preferably, the printed slip then is presented to the account holder 34 for review and signature.

An exemplary sales receipt 1002 and corresponding credit card slip 1004 printed in accordance with the credit card payment system 65 of FIG. 4 are illustrated, respectively, in FIGS. 5 and 6. It will be appreciated that the Quick Guide table may continue to be used by the merchant 36 and that this inventive aspect of the invention is compatible with such conventional feature of POS terminals.

Alternatively, the amount to be paid for the goods, services, or both of the merchant 36, in conjunction with the determined gratuity amount and the grand total to be charged to the account, are presented to the account holder 34 on a display screen, and the signature of the account holder 34 is electronically captured to indicate review and approval of the transaction by the account holder 34.

Upon signature by the account holder 34, no further authorization is necessary and, as will now be appreciated, additional electronic communications between the merchant 36 and the card issuer 32, including communications 49,51,53, 55,57,59 as illustrated in the conventional payment system 30 of FIG. 3, are unnecessary. Moreover, in the credit card payment system 65 of FIG. 4, it is unnecessary for the account holder 34 to determine the gratuity amount, and it is unnecessary for the account holder 34 to calculate the total amount including the gratuity.

As in the conventional credit card payment system 30, the credit card transaction thereafter may be closed out by the merchant 36 with other transactions at the end of the day during "batching". Upon closeout, the acquiring bank 38 initiates the process of transferring funds from the card issuer 32 to the acquiring bank 38, with the fees being deducted by each of the card issuer 32, card association 40, and acquiring bank 38 during the fund transfer processes.

Eventually—usually monthly—the card issuer 32 sends 61 a statement to the account holder 34 for all current transactions charged to the account, and the account holder 34 sends 63 payment on the account to the card issuer 32.

Another Preferred Credit Card Payment System of the Invention

Figure 7:
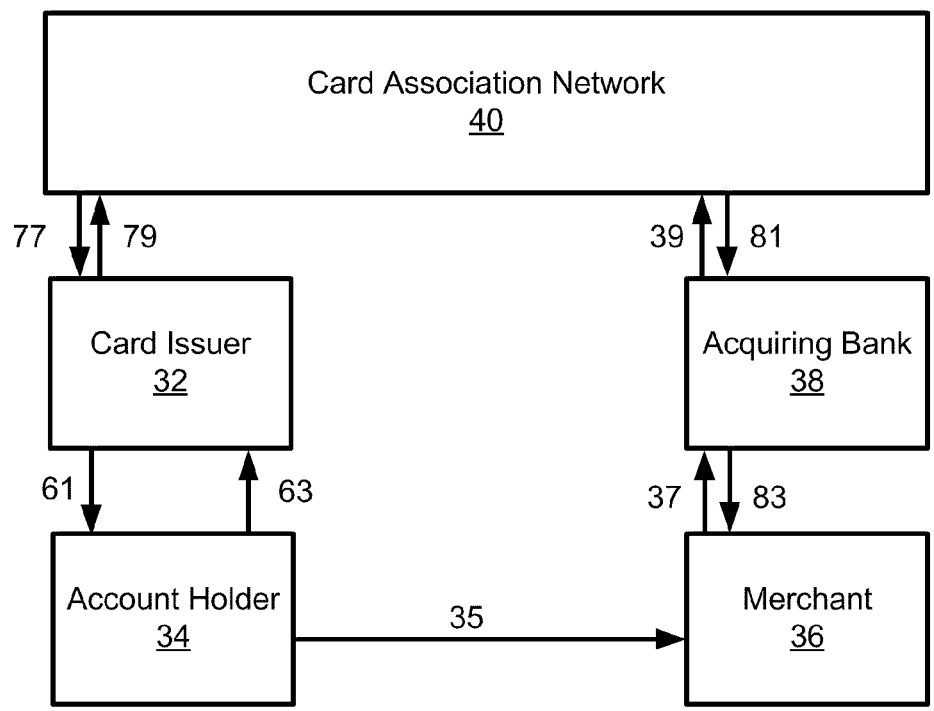
FIG. 7 is an illustration of a preferred credit card payment system 75 in accordance with a preferred embodiment of the present invention.

Turning now to FIG. 7, another preferred payment system 75 is illustrated in accordance with the present invention, wherein credit cards are utilized. The credit cards may be ones bearing the VISA, MASTERCARD, DISCOVER, or AMERICAN EXPRESS marks; however, the present invention is equally applicable to other credit cards (including secured credit cards) as well as to charge cards, stored-value cards, rebate cards, and the like which may be used to pay for goods and services, and gratuities therefor.

In the payment system 75, a card issuer 32—such as a bank—has issued a credit card to an account holder 34, who has opened a credit card account with the card issuer 32. Additionally, a merchant 36 has established an account with an acquiring bank 38 through which amounts charged on credit cards for the merchant's goods, services, or both are credited to the account of the merchant 36.

Thereafter, the account holder 34 presents the credit card to a merchant 36 for payment of an amount owed for goods, services, or both. Furthermore, it is assumed that the transaction includes payment for goods or services, or both, for which a gratuity is normally given.

Upon being presented the card, the merchant 36 reads 35 account information from the card using a point-of-sale (POS) terminal and electronically communicates 37 the account information, amount owed (preferably including both a principal amount owed and an amount of tax owed, and possibly including a total amount owed as well, although in alternative embodiments only a total amount owed may be communicated), and an identification of the merchant 36 to the acquiring bank 38 over a public-switched telephone network. The acquiring bank 38, in turn, electronically communicates 39 the account information, amount owed, and an identification of the merchant 36 to a card association 40 (e.g., Visa or MasterCard).

Upon receipt of this information, the card association 40 identifies that the transaction is the type of transaction that customarily includes a gratuity. The card association 40 identifies the transaction as such preferably based on the information that is communicated, and may identify the transaction as such specifically based on the identification of the merchant 36. In this respect, the card association 40 preferably has predetermined the type of transactions for the merchant 36 based on the known product, service, or both, provided by the merchant 36, or otherwise is able to determine the type of transactions for the merchant 36, such as by querying a database of merchant identifications that may be maintained for such purpose, either by a third party or by the card association 40 itself. Alternatively, data in the information that is communicated identifies the type of service or good, or both, for which a gratuity applies, or specifically identifies a level of gratuity applicable to the type of the transaction.

After identifying the transaction as being a transaction for which a gratuity is applicable, the card association 40 preferably determines a gratuity amount and automatically adds the total of the amount received from the acquiring bank 38 to the determined gratuity amount. The gratuity amount preferably is determined by the card association 40 by multiplying the principal transaction amount received (i.e., not including the received tax amount, although in alternative embodiments the total amount, including tax, may be utilized) by a gratuity percentage applicable to the merchant 36, or applicable to the type of the transaction as identified by the card association 40. In this respect, the gratuity percentage preferably is a default gratuity percentage that is established by the card association 40 for each type of transaction for which a gratuity is applicable; furthermore, such established gratuity percentage preferably is preapproved by the account holder 34 prior to its use for such account holder 34. Alternatively, the gratuity percentage that is used is one that has been established by the account holder 34 for the particular type of transaction being authorized or for the specific merchant 36.

The card association 40 then electronically communicates 77 to the card issuer 32 the account information, the identification of the merchant 36, and an amount equal to the amount sent 39 by the acquiring bank 38 plus the gratuity amount determined by the card association 40. The card issuer 32 receives and verifies that the card is valid and that there is sufficient credit in the account associated with the card to cover the amount equal to the amount sent 39 by the acquiring bank 38 plus the gratuity amount determined by the card association 40. If the verification is successful, the card issuer 32 electronically communicates 79 an authorization code to the card association 40.

Alternatively, the card association 40 electronically communicates 77 to the card issuer 32 the account information, the identification of the merchant 36, the amount sent 39 by the acquiring bank 38, and the determined gratuity amount. The card issuer 32 receives and verifies that the card is valid and that there is sufficient credit in the account associated with the card to cover the amount sent 39 by the acquiring bank 38 plus the determined gratuity amount. If the verification is successful, the card issuer 32 electronically communicates 79 an authorization code to the card association 40.

In either instance, the card association 40 electronically communicates 81 to the acquiring bank 38 both the authorization code received from the card issuer 32 as well as the gratuity amount determined by the card association 40. The acquiring bank 38, in turn, electronically communicates 83 the authorization code and the determined gratuity amount to the merchant 36.

The POS terminal of the merchant 36 receives the authorization code and the determined gratuity amount, and preferably prints a slip documenting the transaction, which slip includes not only the amount to be paid for the goods, services, or both of the merchant 36, but also the determined gratuity amount and the grand total to be charged to the account associated with the card. Preferably, the printed slip then is presented to the account holder 34 for review and signature. It will further be appreciated that the sales receipt 1002 and corresponding credit card slip 1004 of FIGS. 5 and 6 are also exemplary of this credit card payment system 75.

Alternatively, the amount to be paid for the goods, services, or both of the merchant 36, in conjunction with the determined gratuity amount and the grand total to be charged to the account, are presented to the account holder 34 on a display screen, and the signature of the account holder 34 is electronically captured to indicate review and approval of the transaction by the account holder 34.

Upon signature by the account holder 34, no further authorization is necessary and, as will now be appreciated, additional electronic communications between the merchant 36 and the card issuer 32, including communications 49,51,53, 55,57,59 as illustrated in the conventional payment system 30 of FIG. 3, are unnecessary. Moreover, in the credit card payment system 75 of FIG. 7, it is unnecessary for the account holder 34 to determine the gratuity amount, and it is unnecessary for the account holder 34 to calculate the total amount including the gratuity.

As in the conventional credit card payment system 30, the credit card transaction thereafter may be closed out by the merchant 36 with other transactions at the end of the day during "batching". Upon closeout, the acquiring bank 38 initiates the process of transferring funds from the card issuer 32 to the acquiring bank 38, with the fees being deducted by each of the card issuer 32, card association 40, and acquiring bank 38 during the fund transfer processes.

Eventually—usually monthly—the card issuer 32 sends 61 a statement to the account holder 34 for all current transactions charged to the account, and the account holder 34 sends 63 payment on the account to the card issuer 32.

Another Preferred Credit Card Payment System of the Invention

Figure 8:
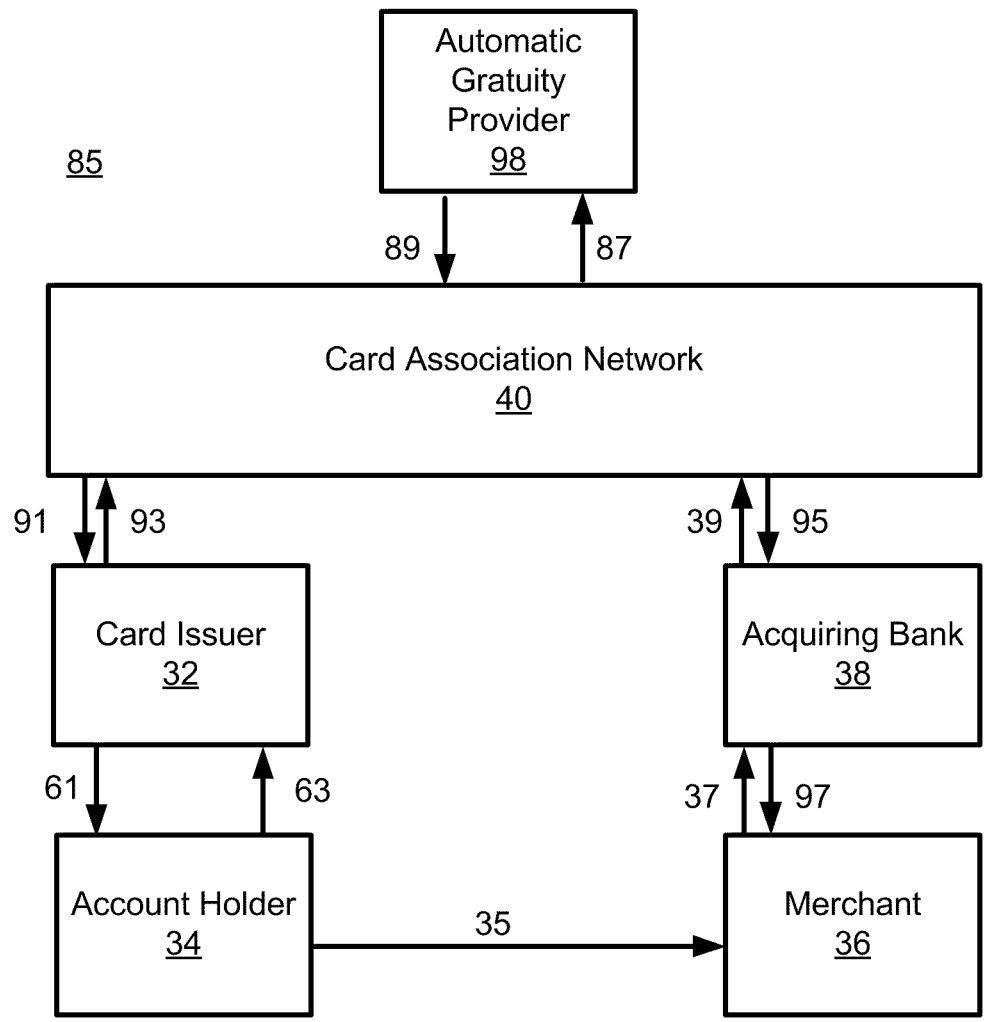
FIG. 8 is an illustration of a preferred credit card payment system 85 in accordance with a preferred embodiment of the present invention.

Turning now to FIG. 8, another preferred payment system 85 is illustrated in accordance with the present invention, wherein credit cards are utilized. The credit cards may be ones bearing the VISA, MASTERCARD, DISCOVER, or AMERICAN EXPRESS marks; however, the present invention is equally applicable to other credit cards (including secured credit cards) as well as to charge cards, stored-value cards, rebate cards, and the like which may be used to pay for goods and services, and gratuities therefor.

In the payment system 85, a card issuer 32—such as a bank—has issued a credit card to an account holder 34, who has opened a credit card account with the card issuer 32. Additionally, a merchant 36 has established an account with an acquiring bank 38 through which amounts charged on credit cards for the merchant's goods, services, or both are credited to the account of the merchant 36.

Thereafter, the account holder 34 presents the credit card to a merchant 36 for payment of an amount owed for goods, services, or both. Furthermore, it is assumed that the transaction includes payment for goods or services, or both, for which a gratuity is normally given.

Upon being presented the card, the merchant 36 reads 35 account information from the card using a point-of-sale (POS) terminal and electronically communicates 37 the account information, amount owed (preferably including both a principal amount owed and an amount of tax owed, and possibly including a total amount owed as well, although in alternative embodiments only a total amount owed may be communicated), and an identification of the merchant 36 to the acquiring bank 38 over a public-switched telephone network. The acquiring bank 38, in turn, electronically communicates 39 the account information, amount owed, and an identification of the merchant 36 to a card association 40 (e.g., Visa or MasterCard).

Upon receipt of this information, the card association 40 identifies that the transaction is the type of transaction that customarily includes a gratuity. The card association 40 identifies the transaction as such preferably based on this information that is communicated, and may identify the transaction as such specifically based on the identification of the merchant 36.

Upon identification of the transaction as being one to which a gratuity is applicable, the card association 40 electronically communicates 87 the account information, amount owed, and the identification of the merchant 36 to a third party automatic gratuity service provider 98. The automatic gratuity provider 98 preferably has predetermined the type of transactions for the merchant 36 based on the known product, service, or both, provided by the merchant 36, or otherwise is able to determine the type of transactions for the merchant 36, such as by querying a database of merchant identifications that may be maintained for such purpose, either by it or by the card association 40. Alternatively, data in the information that is communicated identifies the type of service or good, or both, for which a gratuity applies, or specifically identifies a level of gratuity applicable to the type of the transaction.

Based either on the type of transaction or identification of the merchant, the automatic gratuity provider 98 preferably determines a gratuity amount and automatically adds the total of the amount received from the acquiring bank 38 to the determined gratuity amount. The gratuity amount preferably is determined by the automatic gratuity provider 98 by multiplying the transaction amount received (i.e., not including the received tax amount, although in alternative embodiments the total amount, including tax, may be utilized) by a gratuity percentage applicable to the merchant 36, or applicable to the type of the transaction as identified by the automatic gratuity provider 98. In this respect, the gratuity percentage preferably is a default gratuity percentage that is established by the automatic gratuity provider 98 for each type of transaction for which a gratuity is applicable; furthermore, such established gratuity percentage preferably is preapproved by the account holder prior to its use for such account holder. Alternatively, the gratuity percentage that is used is one that has been established by the account holder 34 for the particular type of transaction being authorized or for the specific merchant 36.

The automatic gratuity provider 98 then electronically communicates 89 to the card association 40 the account information, the identification of the merchant 36, the amount sent 39 by the acquiring bank 38, and the determined gratuity amount. The card association 40 in turn electronically communicates 91 this information to the card issuer 32. The card issuer 32 receives and verifies that the card is valid and that there is sufficient credit in the account associated with the card to cover the amount sent 39 by the acquiring bank 38 plus the determined gratuity amount. If the verification is successful, the card issuer 32 electronically communicates 93 an authorization code and the determined gratuity amount to the card association 40.

The card association 40 electronically communicates 95 to the acquiring bank 38 both the authorization code received from the card issuer 32 as well as the gratuity amount determined by the automatic gratuity provider 98. The acquiring bank 38, in turn, electronically communicates 97 the authorization code and the determined gratuity amount to the merchant 36.

The POS terminal of the merchant 36 receives the authorization code and the determined gratuity amount, and preferably prints a slip documenting the transaction, which slip includes not only the amount to be paid for the goods, services, or both of the merchant 36, but also the determined gratuity amount and the grand total to be charged to the account associated with the card. Preferably, the printed slip then is presented to the account holder 34 for review and signature. It will further be appreciated that the sales receipt 1002 and corresponding credit card slip 1004 of FIGS. 5 and 6 are also exemplary of this credit card payment system 85.

Alternatively, the amount to be paid for the goods, services, or both of the merchant 36, in conjunction with the determined gratuity amount and the grand total to be charged to the account, are presented to the account holder 34 on a display screen, and the signature of the account holder 34 is electronically captured to indicate review and approval of the transaction by the account holder 34.

Upon signature by the account holder 34, no further authorization is necessary and, as will now be appreciated, additional electronic communications between the merchant 36 and the card issuer 32, including communications 49,51,53, 55,57,59 as illustrated in the conventional payment system 30 of FIG. 3, are unnecessary. Moreover, in the credit card payment system 85 of FIG. 8, it is unnecessary for the account holder 34 to determine the gratuity amount, and it is unnecessary for the account holder 34 to calculate the total amount including the gratuity.

As in the conventional credit card payment system 30, the credit card transaction thereafter may be closed out by the merchant 36 with other transactions at the end of the day during "batching". Upon closeout, the acquiring bank 38 initiates the process of transferring funds from the card issuer 32 to the acquiring bank 38, with the fees being deducted by each of the card issuer 32, card association 40, and acquiring bank 38 during the fund transfer processes.

Eventually—usually monthly—the card issuer 32 sends 61 a statement to the account holder 34 for all current transactions charged to the account, and the account holder 34 sends 63 payment on the account to the card issuer 32.

Multiple Card Associations, Single Automatic Gratuity Service Provider

With continuing reference to FIG. 8 and the foregoing description, it will further be appreciated that, by including an automatic gratuity provider 98 in the credit card payment system 85, a single automatic gratuity provider 98 may be used with multiple credit association networks, whereby the same person may use the same automatic gratuity provider 98 for multiple cards that use different card associations.

Figure 9:
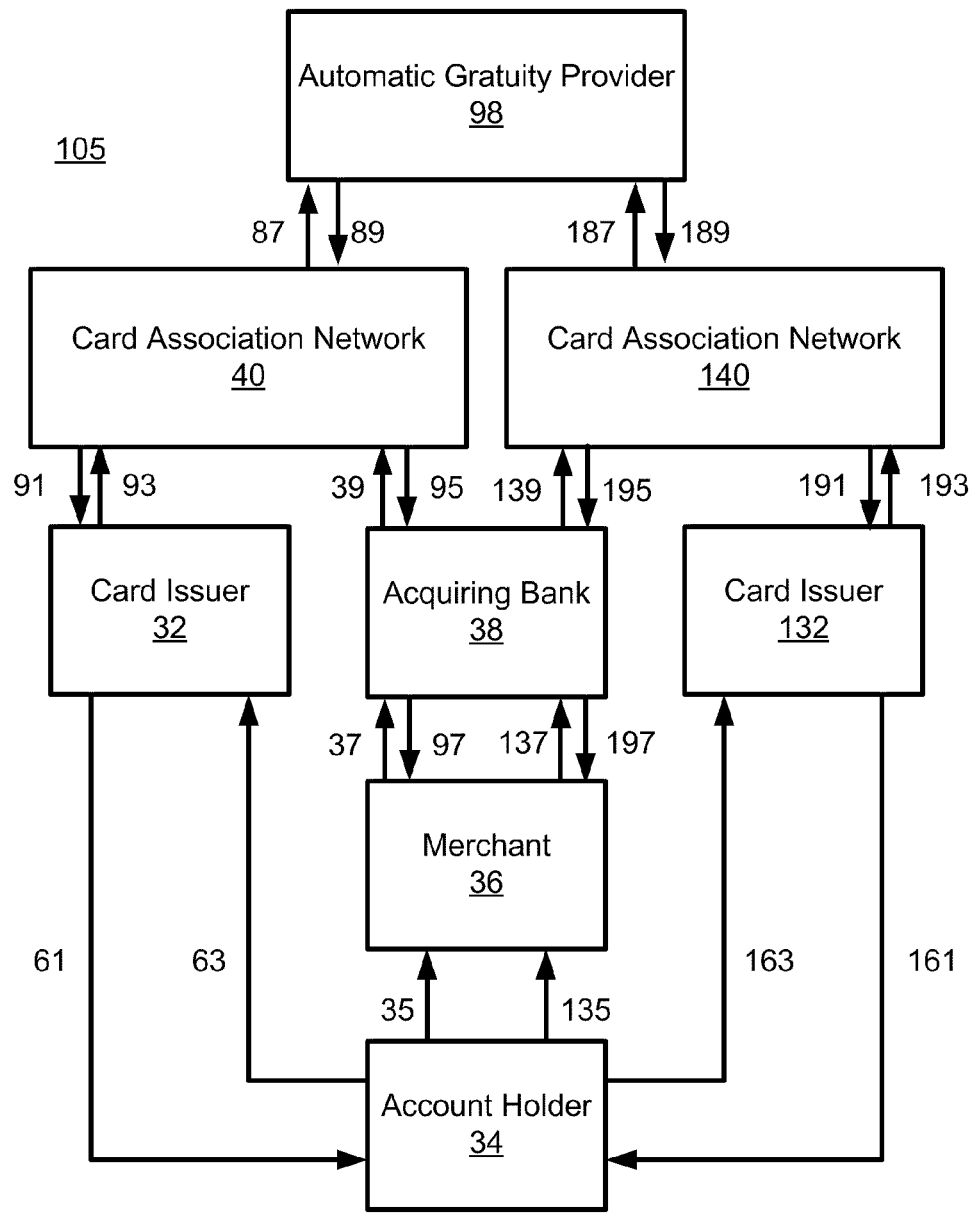
FIG. 9 is an illustration of a preferred credit card payment system wherein a single automatic gratuity provider 98 is used with multiple credit association networks, whereby the same person may use the same automatic gratuity provider for multiple cards that use different card associations.

Such an arrangement is illustrated in FIG. 9, wherein the foregoing credit card payment system 85 is illustrated in conjunction with a second credit card payment system having the same account holder 34, merchant 36, acquiring bank 38, and automatic gratuity provider 98. In this scenario, the same account holder 34 engages the merchant 36 in a second transaction using a different credit card from card issuer 132, which is associated with card association 140.

In this second engagement, the merchant 36 reads 135 account information from the second credit card using the point-of-sale (POS) terminal and electronically communicates 137 the account information, amount owed (preferably including both a principal amount owed and an amount of tax owed, and possibly including a total amount owed as well, although in alternative embodiments only a total amount owed may be communicated), and an identification of the merchant 36 to the acquiring bank 38 over the public-switched telephone network. The acquiring bank 38, in turn, electronically communicates 139 the account information, amount owed, and an identification of the merchant 36 to the second card association 140 (e.g., Visa or MasterCard).

Upon receipt of this information, the card association 140 identifies that the transaction is the type of transaction that customarily includes a gratuity, and the card association 140 electronically communicates 187 the account information, amount owed, and the identification of the merchant 36 to the automatic gratuity provider 98. The automatic gratuity provider 98 determines a gratuity amount and automatically adds the total of the amount received from the acquiring bank 38 to the determined gratuity amount and then electronically communicates 189 to the card association 140 the account information, the identification of the merchant 36, the amount sent 39 by the acquiring bank 38, and the determined gratuity amount.

The card association 140 in turn electronically communicates 191 this information to the second card issuer 132. The card issuer 132 receives and verifies that the card is valid and that there is sufficient credit in the account associated with the card to cover the amount sent 39 by the acquiring bank 38 plus the determined gratuity amount. If the verification is successful, the card issuer 132 electronically communicates 193 an authorization code and the determined gratuity amount to the card association 140.

The card association 140 in turn electronically communicates 195 to the acquiring bank 38 both the authorization code received from the card issuer 132 as well as the gratuity amount determined by the automatic gratuity provider 98. The acquiring bank 38, in turn, electronically communicates 197 the authorization code and the determined gratuity amount to the merchant 36.

Eventually—usually monthly—the card issuer 132 sends 161 a statement to the account holder 34 for all current transactions charged to the account, and the account holder 34 sends 163 payment on the account to the card issuer 132.

Exemplary Methods Performed by Merchant

With reference now to FIGS. 10-11, steps are illustrated of exemplary methods 200,220 performed by a merchant in accordance with preferred embodiments of the invention described above.

The method 200 illustrated in FIG. 10 includes the steps of: receiving 202, from a customer by the merchant, a credit card for payment, the customer preferably being an account holder of the account associated with the credit card; electronically communicating 204, by the merchant for receipt by a third party, both account information from the credit card and an identification of the merchant; electronically receiving 206, by the merchant, a determined gratuity amount; printing 208, by the merchant, a document that includes both the amount owed and the determined gratuity; and presenting 210, by the merchant to the customer, the printed document for signature by the account holder; receiving 212, from the customer by the merchant, the printed documented signed by the customer. The step of printing the document may alternatively be accomplished by presenting a virtual representation of the document on a display, or portions thereof, for review by the customer, and electronically capturing a signature of the customer thereafter, such as by having the customer sign his or her name on a touchscreen display with an appropriate implement.

The method 220 illustrated in FIG. 11 includes the steps of: receiving 222, from a customer by the merchant, a credit card for payment, the customer preferably being an account holder of the account associated with the credit card; electronically communicating 224, by the merchant for receipt by a third party, both account information from the credit card and an identification of the merchant; electronically receiving 226, by the merchant, a determined gratuity amount; presenting 228 on a display screen an image of a document, or portions thereof, including both the amount owed and the determined gratuity for review by the customer; electronically capturing 230 a signature of the customer, such as by having the customer sign his or her name on a touchscreen display with an appropriate implement; and printing 232 a receipt for the customer, including the amount owed, the determined gratuity, and the customer's electronically captured signature. The step of presenting an image of the document includes presenting an image of a document that further includes a sum of the certain amount owed and the gratuity as indicated by the data received by the merchant from the third party.

Additionally, the method may include presenting a solicitation of an alternative gratuity to be charged against an account associated with the payment object that was presented for payment. The solicitation preferably includes an object that is displayed and that is selectable by the customer. In this case, the method further preferably includes the steps of receiving an alternative gratuity amount from the customer, in substitution for the gratuity as indicated by the data received by the merchant from the third party, upon selection of the displayed object by the customer; substituting the alternative gratuity amount for the gratuity as indicated by the data received by the merchant from the third party; and electronically communicating, by the merchant, the certain amount owed and the alternative gratuity amount for authorization. Alternatively, or additionally, the method preferably includes the steps of presenting a suggested alternative gratuity amount in association with the displayed object of the solicitation; upon selection of the displayed object by the customer, substituting the alternative gratuity amount for the gratuity as indicated by the data received by the merchant from the third party; and electronically communicating, by the merchant, the certain amount owed and the alternative gratuity amount for authorization.

Exemplary POS Terminals Used by Merchant

Figure 12A:
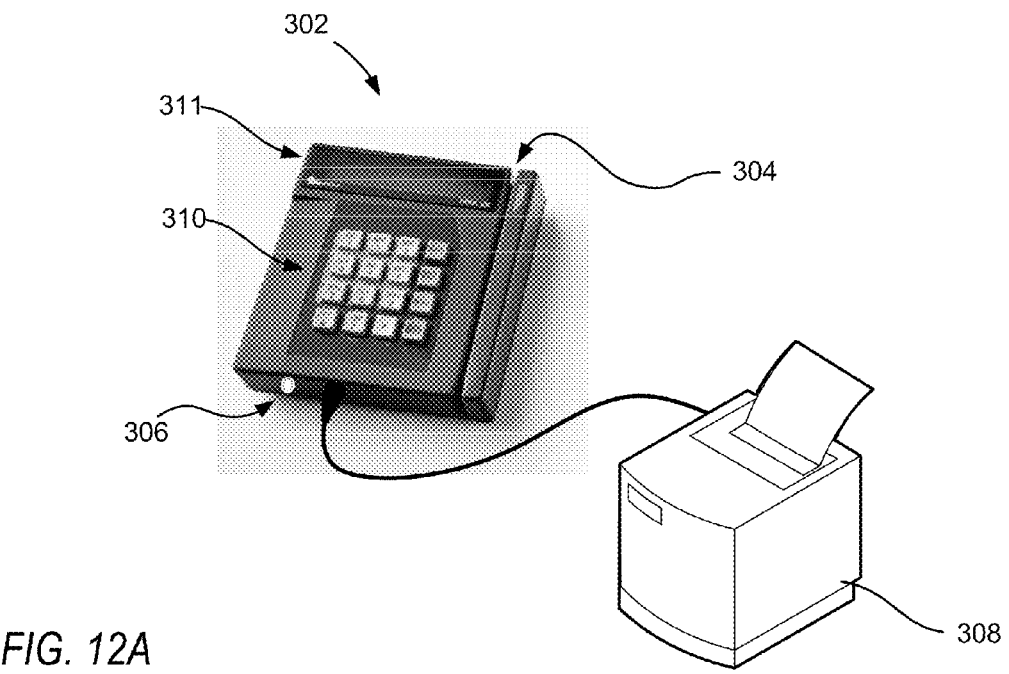
FIG. 12A is an illustration of an exemplary point of sale (POS) terminal for use by a merchant in processing electronic transactions in accordance with one or more preferred embodiments of the invention.
Figure 12B:
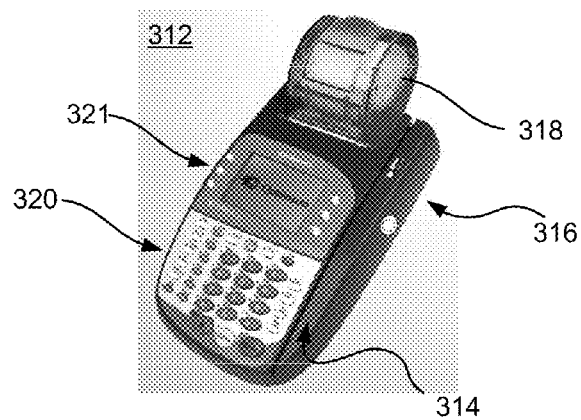
FIG. 12B is an illustration of an exemplary point of sale (POS) terminal for use by a merchant in processing electronic transactions in accordance with one or more preferred embodiments of the invention.
Figure 13:
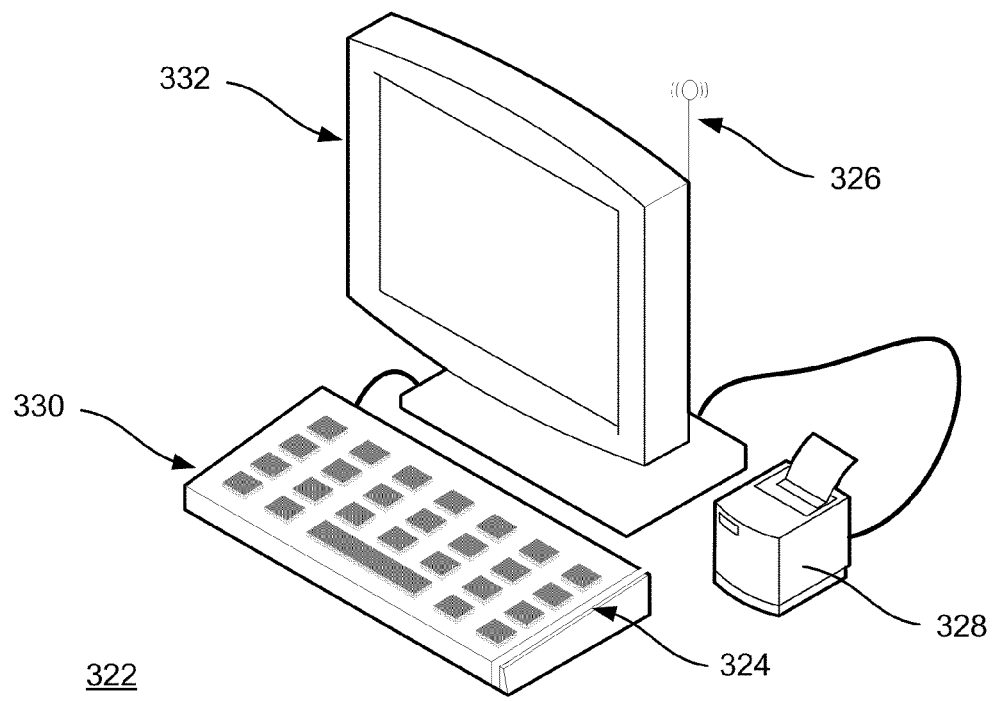
FIG. 13 is an illustration of an exemplary point of sale (POS) terminal for use by a merchant in processing electronic transactions in accordance with one or more preferred embodiments of the invention.

With reference now to FIGS. 12A, 12B and 13, exemplary point of sale (POS) terminals 302,312,322 are illustrated for use by a merchant in processing electronic transactions in accordance with preferred embodiments of the invention described above.

The POS terminal 302 of FIG. 12A includes a first interface 304 configured to receive card information acquired from cards associated with accounts held at card issuers; a second interface 306 configured to electronically communicate over a network with each of the card issuers; and a printer component 308 configured to print a document. The POS terminal 302 is configured to electronically send, through the second interface 306, over the network, to an acquiring bank for receipt by a particular one of the card issuers: card information received through the first interface 304 and acquired from a card issued by the particular card issuer; an identification of the merchant; and the certain amount owed.

The POS terminal 302 further is configured to electronically receive, through the second interface 306, over the network, from the particular card issuer, an authorization to charge to the account associated with the card the certain amount owed, and data that is indicative of a gratuity to be charged to the account associated with the card. The POS terminal 302 is additionally configured to cause the printer component 308 to print a document that includes both the certain amount owed, and the gratuity as indicated by the data received by the merchant from the particular card issuer. An exemplary such document is the slip 1004 of FIG. 6.

The POS terminal 302 preferably includes a controller, which may be a microcontroller, an integrated circuit, or a computer processor; and the POS terminal 302 includes machine-readable medium containing machine-executable instructions for performing a method. The method preferably includes the steps of: electronically sending, through the second interface 306, over the network, to an acquiring bank for receipt by a particular one of the card issuers, card information received through the first interface 304 and acquired from a card issued by the particular card issuer, an identification of the merchant, and the certain amount owed; electronically receiving, through the second interface 306, over the network, from the particular card issuer, an authorization to charge to the account associated with the card the certain amount owed, and data that is indicative of a gratuity to be charged to the account associated with the card; and causing the printer component 308 to print a document that includes both the certain amount owed and the gratuity as indicated by the data received by the merchant from the particular card issuer.

As illustrated, the POS terminal 302 includes a keypad 310 through which a merchant may input an amount owed and a display 311.

The network through which the second interface 306 communicates preferably includes a financial transaction processing network and may comprise the Internet, a public switched telephone network (PSTN), or both.

The POS terminal 312 of FIG. 12B is similar to the POS terminal 302 of FIG. 12A and principally differs in that the printer component 308 of FIG. 12A is separate from, and attached via cable to, the main body of the POS terminal 302, whereas in the POS terminal 312 the printer component 318 comprises an integral part of the POS terminal 312. Like the POS terminal 302, the POS terminal 312 includes a first interface 314 configured to receive card information acquired from cards associated with accounts held at card issuers; and a second interface 316 configured to electronically communicate over a network with each of the card issuers. The POS terminal 312 is configured to electronically send, through the second interface 316, over the network, to an acquiring bank for receipt by a particular one of the card issuers: card information received through the first interface 314 and acquired from a card issued by the particular card issuer; an identification of the merchant; and the certain amount owed. The POS terminal 312 further is configured to electronically receive, through the second interface 316, over the network, from the particular card issuer, an authorization to charge to the account associated with the card the certain amount owed, and data that is indicative of a gratuity to be charged to the account associated with the card. The POS terminal 312 is additionally configured to cause the printer component 318 to print a document that includes both the certain amount owed, and the gratuity as indicated by the data received by the merchant from the particular card issuer. An exemplary such document is the slip 1004 of FIG. 6.

The POS terminal 312 preferably includes a controller, which may be a microcontroller, an integrated circuit, or a computer processor; and the POS terminal 312 includes machine-readable medium containing machine-executable instructions for performing a method. The method preferably includes the steps of: electronically sending, through the second interface 316, over the network, to an acquiring bank for receipt by a particular one of the card issuers, card information received through the first interface 314 and acquired from a card issued by the particular card issuer, an identification of the merchant, and the certain amount owed; electronically receiving, through the second interface 316, over the network, from the particular card issuer, an authorization to charge to the account associated with the card the certain amount owed, and data that is indicative of a gratuity to be charged to the account associated with the card; and causing the printer component 318 to print a document that includes both the certain amount owed and the gratuity as indicated by the data received by the merchant from the particular card issuer.

As illustrated, the POS terminal 312 also includes a keypad 320 through which a merchant may input an amount owed and a display 321.

A computer is configured as the point of sale (POS) terminal 322 of FIG. 13 for use by a merchant in processing electronic transactions. Configuration of a general personal computer for use as a POS terminal is well known and such POS terminals are sold, for example, by Dell and HP.

The POS terminal 322 includes: a first interface 324 that is configured to receive card information acquired from cards associated with accounts held at card issuers; a second interface 326 (which in this particular scenario is a wireless interface of the POS terminal 322) that is configured to electronically communicate over a network with each of the card issuers; a printer component 328 that is configured to print a document; and computer-readable medium containing computer-executable instructions for performing a process comprising the steps of: electronically sending, through the second interface 326, over the network, to a particular one of the card issuers, card information received through the first interface 324 and acquired from a card issued by the particular card issuer, an identification of the merchant, and the certain amount owed; electronically receiving, through the second interface 326, over the network, from the particular card issuer, an authorization to charge to the account associated with the card the certain amount owed, and data that is indicative of a gratuity to be charged to the account associated with the card; and causing the printer component 328 to print a document that includes both the certain amount owed, and the gratuity as indicated by the data received by the merchant from the particular card issuer.

As illustrated, the computer includes a keyboard 330 through which a merchant may input an amount owed and a display screen 332, such as, for example, an LCD monitor. As illustrated, the keyboard 330 includes the first interface 324 in the form of a card reader component through which a magnetic stripe of a card may be swiped for acquiring card information. The keyboard 330 may include, additionally or alternatively, an internal card reader component for wirelessly acquiring card information from wireless transmitters of cards. Also additionally or alternatively, the display screen 332 may include a touchscreen as a user interface for entering data.

Exemplary Method by Entity Providing Automatic Gratuity

Figure 14:
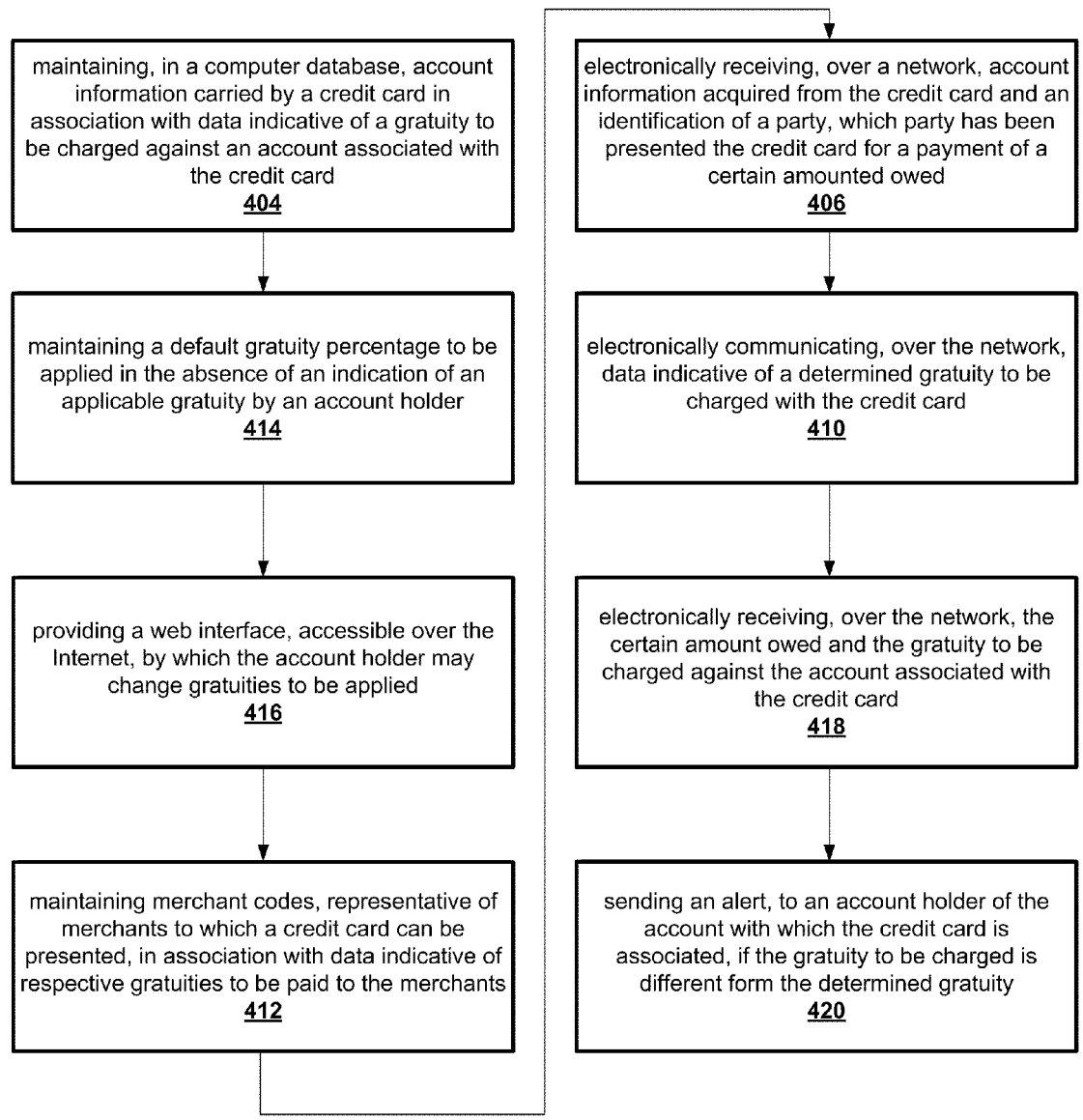
FIG. 14 is an illustration of an exemplary method performed by a party which provides the automatic gratuity in processing electronic transactions in accordance with one or more preferred embodiments of the invention.

With reference now to FIG. 14, an exemplary method 400 is illustrated that is performed by a party that provides the automatic gratuity in processing electronic transactions in accordance with preferred embodiments of the invention described above. Such party may be a card issuer, the card association, or an independent third party provider of the automatic gratuity service.

The method 400 illustrated in FIG. 14 includes the steps of: maintaining 404, in a computer database, account information carried by a credit card in association with data indicative of a gratuity to be charged against an account associated with the credit card; electronically receiving 406, over a network, account information acquired from the credit card and an identification of a party, which party has been presented the credit card for a payment of a certain amounted owed; electronically accessing, from the computer database, data indicative of a gratuity to be charged against the account associated with the credit card; and electronically communicating 410, over the network, data indicative of a gratuity to be charged against the account associated with the credit card.

Data indicative of a gratuity that is maintained in the database preferably represents a percentage that is applied to a certain amount owed when determining a gratuity to be charged for a particular electronic transaction. In optional features, the data indicative of a gratuity that is maintained in the database represents: a percentage of a certain amount owed, and rounded to the nearest whole dollar, for calculating the gratuity to be charged; a percentage of a certain amount owed, and rounded to the nearest whole or half dollar, for calculating the gratuity to be charged; a percentage of a certain amount owed, and rounded to a predetermined penny amount, for calculating the gratuity to be charged. With respect to this latter instance, the predetermined penny amount may be set by the account holder, and the predetermined penny amount may be set by the account holder by specifying an algorithm for determining the penny amount. When an algorithm is specified, the algorithm may include incrementing the penny amount of the previous gratuity paid by a cent, such that transactions with gratuities that are paid with the payment object can be sequentially counted on statements for the account.

The method 400 may further include maintaining 412 merchant codes, representative of merchants to which a credit card can be presented, in association with data indicative of respective gratuities to be paid to the merchants; and maintaining 414 a default gratuity percentage that is applied in the absence of an indication of an applicable gratuity by an account holder. The default percentage may be established by the party providing the gratuity service, and application of the default percentage preferably is subject to prior approval of the account holder. In an alternative scenario, the default percentage that is applied is established by the account holder, and is applied absent a specified percentage for a particular service or for a particular merchant.

The method 400 also further includes the step of changing, by a holder of the account associated with a credit card for which account information is maintained in the computer database, one or more of the respective gratuities to be paid to the merchants; and the step of providing 416 a web interface, accessible over the Internet, by which the holder of the account associated with the credit card changes the one or more respective gratuities to be paid to the merchants from the account of the account holder. The web interface that is provided preferably is accessible over the Internet. The account holder, using the web interface, preferably is able to review and approve default gratuities as well as review and change a particular default gratuity corresponding to a particular category of good or service or corresponding to a specific merchant.

The method 400 also further includes: electronically receiving 418, over the network, the certain amount owed and the gratuity to be charged against the account associated with the credit card; and sending 420 an alert, to an account holder of the account with which the credit card is associated, if the gratuity to be charged against the account associated with the credit card does not equal the gratuity indicated by the data maintained in the database; or, alternatively, sending 420 an alert to an account holder of the account if the gratuity to be charged against the account associated with the credit card differs by a predetermined threshold from the gratuity indicated by the data maintained in the database, in which case the predetermined threshold may be set by the holder of the account.

Exemplary Web Interface for Setting, Viewing and Changing Gratuities by Account Holder FIGS. 15-18 are views 1500,1600,1700,1800 of an exemplary web interface for setting, viewing, and changing gratuities by an account holder over the Internet. In particular, the view 1500 of FIG. 15 shows a graphical user interface having a first column titled "Merchant Category"; a second column titled "Gratuity %"; and a third column titled "Major Code".

The first column sets forth four categories for which gratuities are commonly given, including "Hair Salon", "Taxi Service", "Massage Service", and "Delivery Services". Additional categories may be added using the "Add . . . " button.

The second column sets forth respective default gratuity for each of the listed categories. The default gratuities shown include 18.5% for restaurant services, 11.0% for hair salon services, 8.0% for taxi services, 22.0% for massage services, and 10.0% for delivery services. A code associated with each category is set forth in the third column, with the category code being identified as a "major" code.

It will further be noted that each row includes, at the beginning, an "expand" button for expanding each row.

FIG. 16 represents a view 1600 of the graphical user interface after selecting the "expand" button of the first row corresponding to restaurant services. Upon selecting the expand button, four additional rows are displayed corresponding to three restaurants, i.e., Chili's, Subway, and Flemings, and an "add" button. As illustrated, a gratuity percentage for Chili's has not been specified; a gratuity percentage of 7.0% has been specified for Subway; and a gratuity percentage of 22.0% has been specified for Flemings. A minor code also is shown, which code corresponds to companies or merchants, but not necessarily to any particular store or location if there is more than one.

It additionally will be noted that a new column is displayed containing an "expand" button for expanding each row.

FIG. 17 represents a further view 1700 of the graphical user interface after selecting the "expand" button for the Chilli's row of FIG. 16. Upon selecting this expand button, four additional rows are displayed corresponding to three Chilli's restaurant locations and an "add" button. As illustrated, a gratuity percentage of 20.0% has been specified for Chili's location at 4409 N Lamar Street; a gratuity percentage of 18.5% has been specified for Chili's location at 1019 E Market Street; and a gratuity percentage of 16.5% has been specified for Chili's location at 123 Main Street. A "specific" code also is shown, which code corresponds to each particular store or location if more than one exists.

FIG. 18 is a view 1800 of an associated website interface that sets forth recent transaction information for which automatic gratuities were implemented.

In a variation of the web interface, it is contemplated that caps can be established by the account holder that set limits on tips as well as expenses. Moreover, in business card contexts, corporate policies can be utilized by administrators to set caps on tips and expenses.

Exemplary Methods of Preferred Systems

Figure 19:
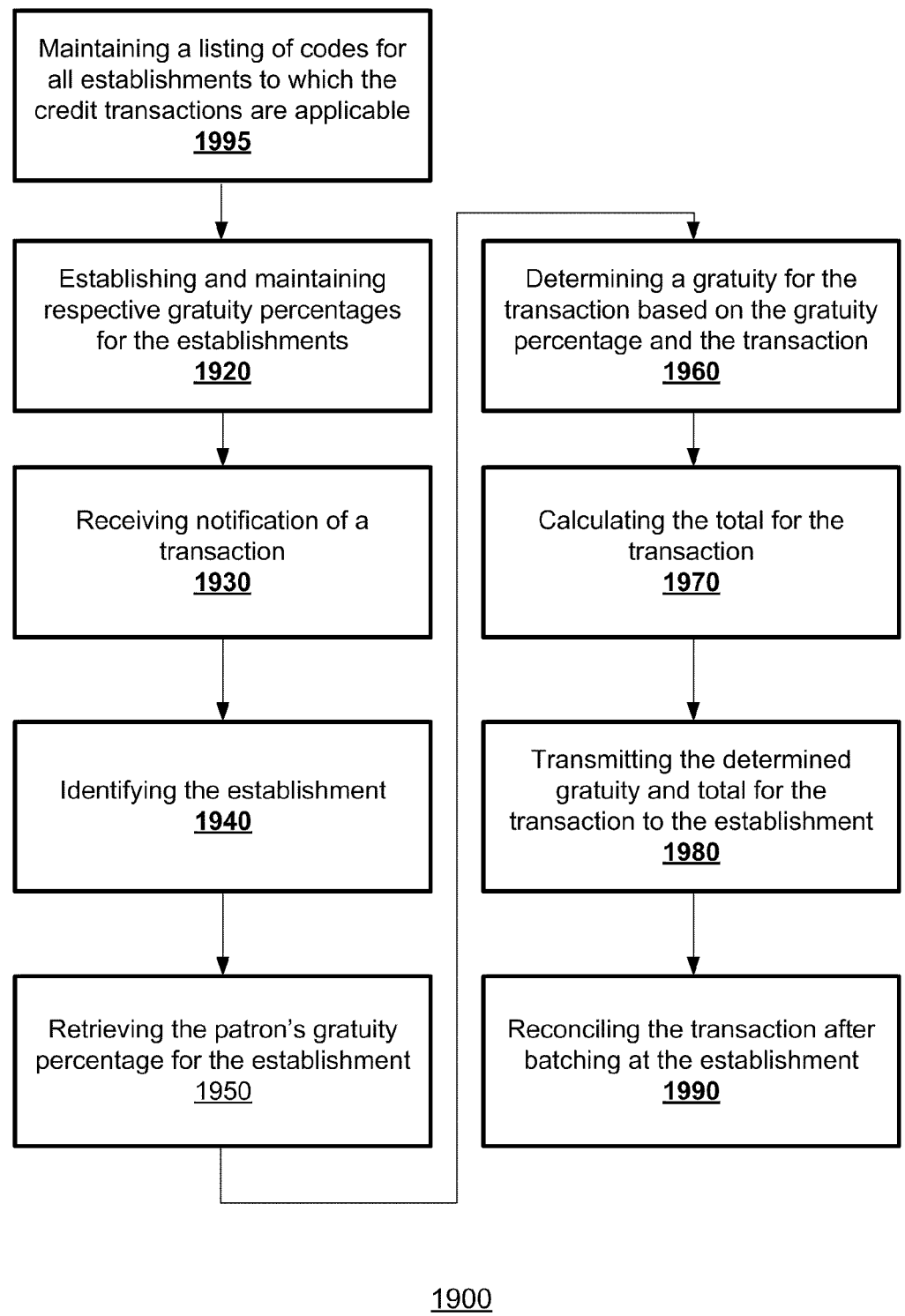
FIG. 19 is an illustration of an exemplary method for allowing a patron to set a percentage gratuity amount to automatically add to credit transactions in accordance with one or more preferred embodiments of the invention.

With reference to FIG. 19, an exemplary method 1900 for allowing a patron to set a percentage gratuity amount to automatically add to credit transactions, in accordance with one or more preferred embodiments of the invention, includes the steps of: setting 1920 a percentage for an establishment; receiving 1930 notification of a transaction; identifying 1940 the establishment; retrieving 1950 a patron's setting of gratuity; calculating 1960 a gratuity for the transaction; recalculating 1970 the total transaction; transmitting 1980 the total to establishment; and reconciling 1990 the transaction. The method 1900 further preferably includes maintaining 1995 a listing of codes for all establishments to which the credit transactions are applicable.

Setting the percentage for the certain establishment may include setting a standard gratuity percentage for establishments not specifically set by the patron, and may further include prompting the patron to set the standard gratuity percentage. Moreover, prompting the patron to set a standard gratuity percentage may include prompting the patron to set a standard gratuity percentage for categories of establishments such as restaurants, bars, and salons.

The step of receiving notification of a transaction may include electronic notification by telephone line, Internet connection, or wireless connection, that a credit card transaction may occur.

Transmitting the total to the establishment may include transmitting the total before prompting the establishment to get a signature, transmitting the total after prompting the establishment to get a signature, and such electronic transmission may be by telephone line, Internet connection, or wireless connection.

An exemplary system implementing the method 1900 for allowing a patron to set a percentage gratuity amount for certain establishments, which is added automatically to the patron's credit transaction, includes: instructions for setting a percentage for an establishment; instructions for notifying patron's credit company of a transaction by an establishment that is charging a patron's account; instructions for identifying the establishment that is charging a patron's account; instructions for retrieving the patron's settings for gratuity of the establishment that is charging a patron's account; instructions for calculating the gratuity of the transaction associated with the patron's settings for gratuity of the establishment that is charging a patron's account; instructions for recalculating the total charge on the patron's account of the establishment that is charging a patron's account; instructions for transmitting the total charge to the establishment that is charging a patron's account; and instructions for reconciling the transaction. The instruction may comprise software instructions saved in a computer-readable medium including an optical disk or memory.

Alternative Present Invention

Finally, as an alternative to the automatic tip and total prepopulating of the present invention, it also is contemplated that the foregoing disclosure can be utilized in enabling an account holder to customize and select for printing on credit card slips-preferably through an appropriate web interface-selected percentage gratuities and corresponding gratuity amounts and totals. Such a printout would appear similar to the Quick Guide table shown in FIG. 3, but would be customized to the account holder. In contrast to the Quick Guide, each account holder is preferably able to effectively customize the row(s) showing the gratuity percentage(s) and corresponding gratuity amounts and totals in accordance with the alternative present invention.

Figure 21:
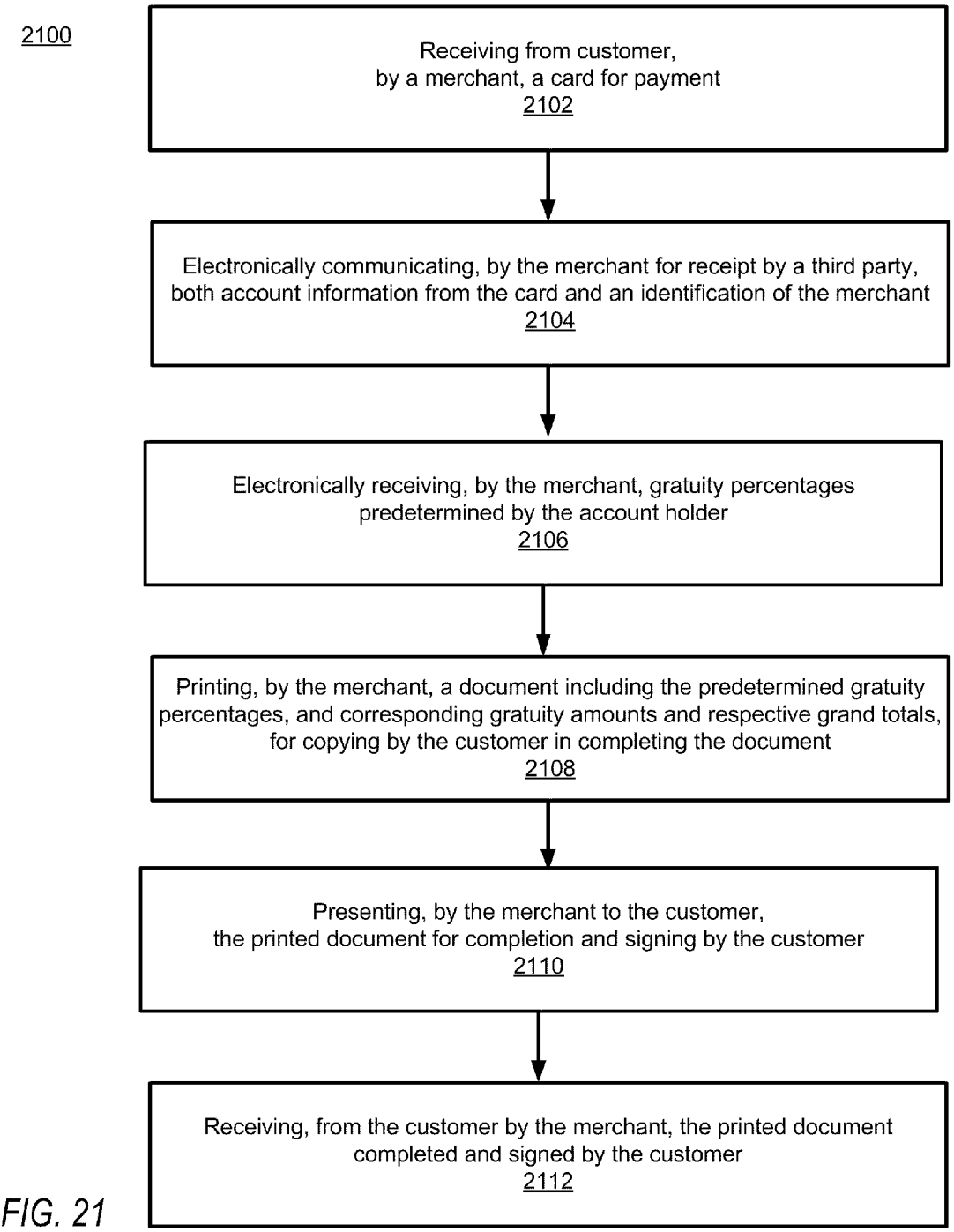
FIG. 21 is a method in accordance with one or more preferred embodiments of the alternative present invention.
Figure 22:
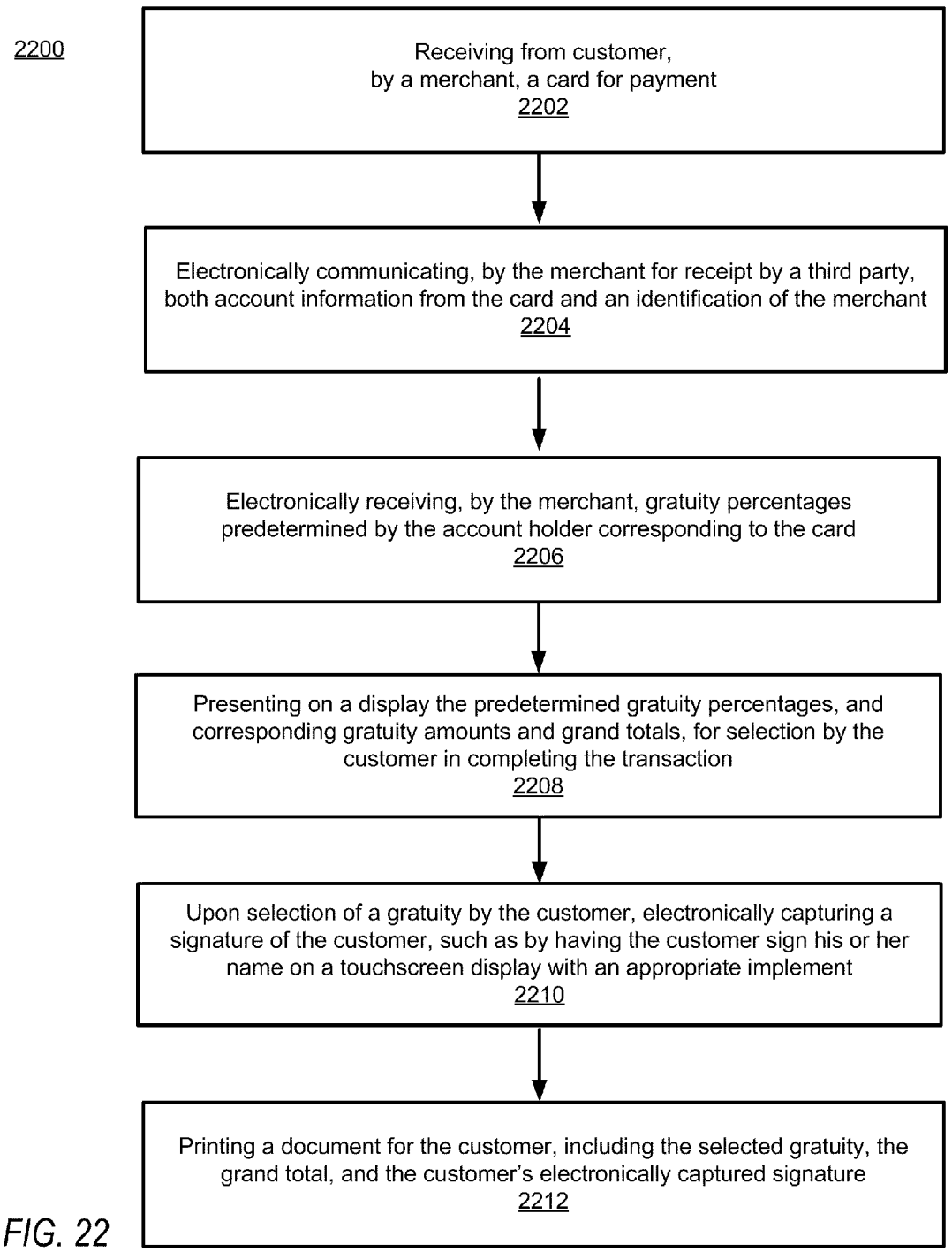
FIG. 22 is another method in accordance with one or more preferred embodiments of the alternative present invention.

In particular detail, and with reference to FIGS. 20-22, a credit card slip 2000 in accordance with this alternative present invention is illustrated in FIG. 20. In this case, the account holder has established gratuity levels at 12.5%; 15.0%; 17.5%; and 20.0% as his or her preferred levels. Consequently, a table with these gratuity levels is printed on the credit card slip for this particular account holder, together with the corresponding dollar amounts. Additionally, the grand totals including the respective gratuities are also printed for use by the account holder when completing the printed line for adding a gratuity and the printed line for the total amount of the credit card slip.

A method 2100 performed by a merchant in accordance with one or more preferred embodiments of the alternative present invention is illustrated in FIG. 21. The method includes the steps of: receiving 2102 from a customer, by a merchant, a card for payment, the customer preferably being an account holder or authorized user of the account associated with the card; electronically communicating 2104, by the merchant for receipt by a third party, both account information from the card and an identification of the merchant; electronically receiving 2106, by the merchant, one or more gratuity percentages that have been predetermined by the account holder; printing 2108, by the merchant, a document including the predetermined gratuity percentages, corresponding gratuity amounts for the transaction, and respective grand totals, whereby the customer may select a predetermined gratuity percentage and merely copy the corresponding gratuity amount and total amount in completing the printed document; presenting 2110, by the merchant to the customer, the printed document for completion and signing by the customer, thereby indicating the customer's approval of the transaction and gratuity; and receiving 2112, by the merchant from the customer, the printed document completed and signed by the customer. Preferably, the printed and completed document is a credit card sales slip when the card that is used is a credit card.

Another method 2200 performed by a merchant in accordance with one or more preferred embodiments of the alternative present invention is illustrated in FIG. 22. The method includes the steps of: receiving 2202 from a customer, by a merchant, a card for payment, the customer preferably being an account holder or authorized user of the account associated with the card; electronically communicating 2204, by the merchant for receipt by a third party, both account information from the card and an identification of the merchant; electronically receiving 2206, by the merchant, one or more gratuity percentages that have been predetermined by the account holder; presenting 2208 on a display the predetermined gratuity percentages, predetermined gratuity amounts, and respective grand totals for selection by the customer in completing the transaction; upon selection of one of the predetermined gratuity percentages, predetermined gratuity amounts, and respective grand totals, electronically capturing 2210 a signature of the customer, such as by having the customer sign his or her name on a touchscreen display with an appropriate implement; and printing 2212 a document for the customer, including the amount owed, the predetermined gratuity selected by the customer for use in the current transaction, the grand total, and the customer's electronically captured signature. The printed document preferably is a credit card sales slip when the card that is used is a credit card. The printed document further may include, preferably in tabular form, the predetermined gratuity percentages that were presented for selection by the customer, the corresponding gratuity amounts for the particular transaction, and the respective grand totals.

While the foregoing description has focused on the context of the account holder presenting the card to the merchant, it will be appreciated that an authorized user of a card of the account of the account holder equally may present the card in accordance with embodiments of the present invention.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

For example, while the foregoing detailed description has referred to cards, it will be appreciated by the Ordinary Artisan that the present invention is equally applicable to other forms of payment objects other than the aforementioned cards, and it will be appreciated that the scope of the present invention encompasses payment objects other than cards so long as such payment objects bear sufficient account information to enable payment from an account in satisfaction of the goods, services, or both, of a merchant, as well as payment of a related gratuity. Such payment objects may include devices for generating digital signatures and for performing encryption, and for securely containing encryption keys and private keys of public-private key pairs, and may include such common consumer electronic devices as mobile phones, personal digital assistants, and smartphones such as the iPhone from Apple, the G1 phone from Google, or the like.

What is claimed is:

1. A point of sale (POS) terminal for use by a merchant in processing electronic transactions, comprising:
   (a) a first interface configured to receive card information acquired from cards associated with accounts held at card issuers,
   (b) a second interface configured to electronically communicate over a network with each of the card issuers; and
   (c) a printer component configured to print a document;
   (d) wherein the POS terminal is configured to,
      (i) electronically send, through the second interface, over a network, to a particular one of the card issuers,
         (A) card information received through the first interface and acquired from a card issued by the particular card issuer,
         (B) an identification of the merchant, and
         (C) the certain amount owed,
      (ii) electronically receive, through the second interface, over a network, from the particular card issuer,
         (A) an authorization to charge to the account associated with the card the certain amount owed, and
         (B) data that is indicative of a gratuity to be charged to the account associated with the card; and
      (iii) cause the printer component to print a document that includes both,
         (A) the certain amount owed, and
         (B) the gratuity as indicated by the data received by the merchant from the particular card issuer.

2. The POS terminal of claim 1, further comprising a controller, wherein the POS terminal is specifically configured to process electronic transactions representing payment from accounts for goods or services in association with which gratuities may be given.

3. The POS terminal of claim 1, wherein the controller comprises a microcontroller.

4. The POS terminal of claim 1, wherein the controller comprises an integrated circuit.

5. The POS terminal of claim 1, wherein the controller comprises a processor.

6. The POS terminal of claim 1, further comprising machine-readable medium containing machine-executable instructions for performing a method, the method comprising the steps of,
   (a) electronically sending, through the second interface, over the network, to a particular one of the card issuers,
      (i) card information received through the first interface and acquired from a card issued by the particular card issuer,
      (ii) an identification of the merchant, and
      (iii) the certain amount owed,
   (b) electronically receiving, through the second interface, over the network, from the particular card issuer,
      (i) an authorization to charge to the account associated with the card the certain amount owed, and
      (ii) data that is indicative of a gratuity to be charged to the account associated with the card; and
   (c) causing the printer component to print a document that includes both,
      (i) the certain amount owed, and
      (ii) the gratuity as indicated by the data received by the merchant from the particular card issuer.

7. The POS terminal of claim 1, further comprising a keypad through which a user may input an amount owed.

8. The POS terminal of claim 1, wherein the POS terminal is configured to electronically send the card information received through the first interface and acquired from the card, the identification of the merchant, and the certain amount owed, over a public communications network.

9. The POS terminal of claim 8, wherein the public communications network comprises a public switched telephone network (PSTN).

10. The POS terminal of claim 8, wherein the public communications network comprises the Internet.

11. The POS terminal of claim 1, wherein the POS terminal is configured to electronically send the card information received through the first interface and acquired from the card, the identification of the merchant, and the certain amount owed, over a financial transaction processing network for receipt by the card issuer.

12. A non-transitory machine-readable medium containing machine-executable instructions for performing a method comprising the steps of:
- (a) electronically sending, through a network interface, over a network, to a card issuer,
  - (i) card information acquired from a card issued by the card issuer,
  - (ii) an identification of the merchant, and
  - (iii) the certain amount owed,
- (b) electronically receiving, through the network interface, over the network, from the card issuer,
  - (i) an authorization to charge to the account associated with the card the certain amount owed, and
  - (ii) data that is indicative of a gratuity to be charged to the account associated with the card; and
- (c) causing the printer component to print a document that includes both,
  - (i) the certain amount owed, and
  - (ii) the gratuity as indicated by the data received by the merchant from the particular card issuer.

13. A computer configured as a point of sale (POS) terminal for use by a merchant in processing electronic transactions, comprising:
- (a) a first interface configured to receive card information acquired from cards associated with accounts held at card issuers;
- (b) a second interface configured to electronically communicate over a network with each of the card issuers;
- (c) a printer component configured to print a document; and
- (d) computer-readable medium containing computer-executable instructions for performing a process comprising the steps of,
  - (i) electronically sending, through the second interface, over a network, to a particular one of the card issuers,
    - (A) card information received through the first interface and acquired from a card issued by the particular card issuer,
    - (B) an identification of the merchant, and
    - (C) the certain amount owed,
  - (ii) electronically receiving, through the second interface, over a network, from the particular card issuer,
    - (A) an authorization to charge to the account associated with the card the certain amount owed, and
    - (B) data that is indicative of a gratuity to be charged to the account associated with the card; and
  - (iii) causing the printer component to print a document that includes both,
    - (A) the certain amount owed, and
    - (B) the gratuity as indicated by the data received by the merchant from the particular card issuer.

14. The computer configured as a point of sale (POS) terminal according to claim 13, further comprising a keypad through which a user may input an amount owed.

15. The computer configured as a point of sale (POS) terminal according to claim 13, wherein the keyboard further comprises a card reader component for acquiring card information from magnetic stripes of cards.

16. The computer configured as a point of sale (POS) terminal according to claim 13, wherein the keyboard further comprises a card reader component for wirelessly acquiring card information from wireless transmitters of cards.

17. The computer configured as a point of sale (POS) terminal according to claim 13, wherein the computer is configured to electronically send the card information received through the first interface and acquired from the card, the identification of the merchant, and the certain amount owed, over a public communications network.

18. The computer configured as a point of sale (POS) terminal according to claim 17, wherein the public communications network comprises a public switched telephone network (PSTN).

19. The computer configured as a point of sale (POS) terminal according to claim 17, wherein the public communications network comprises the Internet.

20. The computer configured as a point of sale (POS) terminal according to claim 13, wherein the computer is configured to electronically send the card information received through the first interface and acquired from the card, the identification of the merchant, and the certain amount owed, over a financial transaction processing network for receipt by the card issuer.

* * * * *